340-870.11 SR

XR 2,549,401

April 17, 1951 I. M. STEIN ET AL 2,549,401

MULTIPOINT RECORDER

Filed Oct. 28, 1944 10 Sheets-Sheet 1

INVENTORS
IRVING M STEIN
ALBERT J. WILLIAMS, JR.
WILLIAM RUSSELL CLARK
BY Virgil E. Woodcock
Attorney April 17, 1951 — I. M. STEIN ET AL — 2,549,401

MULTIPOINT RECORDER

Filed Oct. 28, 1944 — 10 Sheets-Sheet 2

INVENTORS
IRVING M STEIN
ALBERT J. WILLIAMS, JR.
WILLIAM RUSSELL CLARK
BY Virgil E. Woodcock
Attorney.

INVENTORS
IRVING M. STEIN
ALBERT J. WILLIAMS, JR.
WILLIAM RUSSELL CLARK
BY Virgil E. Woodcock
Attorney.

April 17, 1951 I. M. STEIN ET AL 2,549,401
MULTIPOINT RECORDER
Filed Oct. 28, 1944 10 Sheets-Sheet 4

INVENTORS
IRVING M. STEIN
ALBERT J. WILLIAMS, JR.
WILLIAM RUSSELL CLARK
BY Virgil E. Woodcock
Attorney.

INVENTORS
IRVING M. STEIN
ALBERT J. WILLIAMS, JR.
WILLIAM RUSSELL CLARK
BY Virgil E. Woodcock
Attorney.

April 17, 1951

I. M. STEIN ET AL 2,549,401

MULTIPOINT RECORDER

Filed Oct. 28, 1944

10 Sheets-Sheet 6

INVENTORS
IRVING M. STEIN
ALBERT J. WILLIAMS, JR.
WILLIAM RUSSELL CLARK
BY Virgil E. Woodcock
Attorney.

INVENTORS
IRVING M. STEIN
ALBERT J. WILLIAMS, JR.
WILLIAM RUSSELL CLARK
BY Virgil E. Woodcock
ATTORNEY.

April 17, 1951 | I. M. STEIN ET AL | 2,549,401

MULTIPOINT RECORDER

Filed Oct. 28, 1944 | 10 Sheets-Sheet 8

INVENTORS
IRVING M. STEIN
ALBERT J. WILLIAMS
WILLIAM RUSS

April 17, 1951 I. M. STEIN ET AL 2,549,401

MULTIPOINT RECORDER

Filed Oct. 28, 1944 10 Sheets-Sheet 9

INVENTORS
IRVING M. STEIN
ALBERT J. WILLIAMS, JR.
WILLIAM RUSSELL CLARK
BY Virgil E. Woodcock
Attorney INVENTOR
IRVING M. STEIN
ALBERT J. WILLIAMS, JR.
WILLIAM RUSSELL CLARK
BY Virgil E. Woodcock
Attorney Patented Apr. 17, 1951 2,549,401

UNITED STATES PATENT OFFICE 2,549,401

MULTIPOINT RECORDER

Irving M. Stein and Albert J. Williams, Jr., Philadelphia, and William Russell Clark, Abington, Pa., assignors to Leeds and Northrup Company, Philadelphia, Pa., a corporation of Pennsylvania Application October 28, 1944, Serial No. 560,890

44 Claims. (Cl. 346—33)

This invention relates to recording systems, more particularly to the provision of a system by means of which a single recording instrument may be utilized to record a number of variable conditions far in excess of the number of points which may be incorporated into the instrument proper. Further, in accordance with the invention, the magnitude of every condition is not only accurately measured and visually indicated on a scale but a distinctive record is made of the magnitude of each such condition.

Typical of applications to which the invention may be applied, is the testing of airplanes. Each airplane engine is studied in terms of the temperatures developed at a large number of points. With multi-engined planes, the points are multiplied far beyond the capacity of recorders generally available. Moreover, in a test flight, there is insufficient time to make a detailed study of the variation of each recorded temperature. It is, therefore, important to record each temperature on a chart in such a distinctive manner that each recorded temperature may be readily identified. On the other hand, it is important on a test flight to know at once the temperatures of the more critical points of each engine. Provision is made for quick measurement of any desired temperature or of a plurality of such temperatures in any desired order.

It will be further understood that the temperatures of interest will vary from an outside atmospheric or stratospheric temperature, which may be far below zero, to the relatively high exhaust gas temperatures, of the order of 2000° F. In typical installations the number of points or temperatures to be measured have been as high as 100 or more, although the invention is applicable to the measurement and recording of any desired number of temperatures.

Because of its application to airplanes, weight, compactness, and reliability of operation regardless of vibration and the like are of importance, and the operation of the system as a whole must be independent of wide changes in altitude.

In carrying out the invention in one form thereof, there has been accomplished the automatic and continuous measurement and recording in succession of 140 separate temperatures at the rate of a temperature measurement every 1.63 seconds. Provision is made for applying to the recorder chart a distinctive marking by means of which the thermocouple to which the instrument responds at each point or cycle may be identified.

Provision is made for exclusion or inclusion in the recorder measuring circuit of any desired number of thermocouples. Regardless of the number of thermocouples selected, the recorder automatically and in succession measures and records the temperatures of the selected thermocouples.

If at any time it is desired quickly to obtain temperature measurements from any particular one of the thermocouples, provision is made for immediate connection of the recorder to the desired thermocouple. After the desired temperature has been measured, automatic operation may be thereafter resumed or other selected thermocouples may be connected to the recorder for immediate measurement of the temperature thereof. The foregoing operations may be carried out without interfering with subsequent automatic operation and without the possibility of improper out-of-step automatic operation. In other words, the operations as a whole are foolproof.

Contributing to the aforesaid operations and to the reliability of the system as a whole are a number of additional novel features of the invention. More specifically, an automatic compensating system to correct for changes in the cold junction temperatures is combined with a method and means of distinctively identifying each thermocouple whose temperature is recorded. The recorder itself operates at high speed to an accurate temperature-indicating position without over or under travel. It is critically damped. For manual operation the driving motor has a braking effort applied to it just prior to each printing operation. When automatic operation is resumed the braking effort is applied to the motor on the next printing operation. Thereafter the braking means is disabled or rendered ineffective.

Automatic operation may be resumed after the completion of a full cycle or it may, as the operator may desire, be immediately resumed by returning all circuit elements to their initial positions for the beginning of a new cycle.

For a more detailed explanation of the invention, and for further objects and advantages thereof, reference is to be had to the following detailed description, taken in conjunction with the accompanying drawings, in which:

Fig. 1 diagrammatically illustrates a VII-bank multiple-point switch box together with associated thermocouples and a preferred form of recorder;

Fig. 2 is an enlarged view of a fractional part of the recorder, including the recorder chart and scale;

Fig. 2–A is an enlarged fractional view of the manner in which bank-identifying numerals may appear on the chart in different relation than as shown in Fig. 2;

Fig. 3 diagrammatically illustrates the general arrangement of certain of the elements of the invention with respect to each other;

It is believed that a clear understanding of the arrangement and operation of the various parts of the system will be facilitated by first presenting a general description of the operation of the various elements of the system, and their organization with respect to each other in the system.

Figure 1:
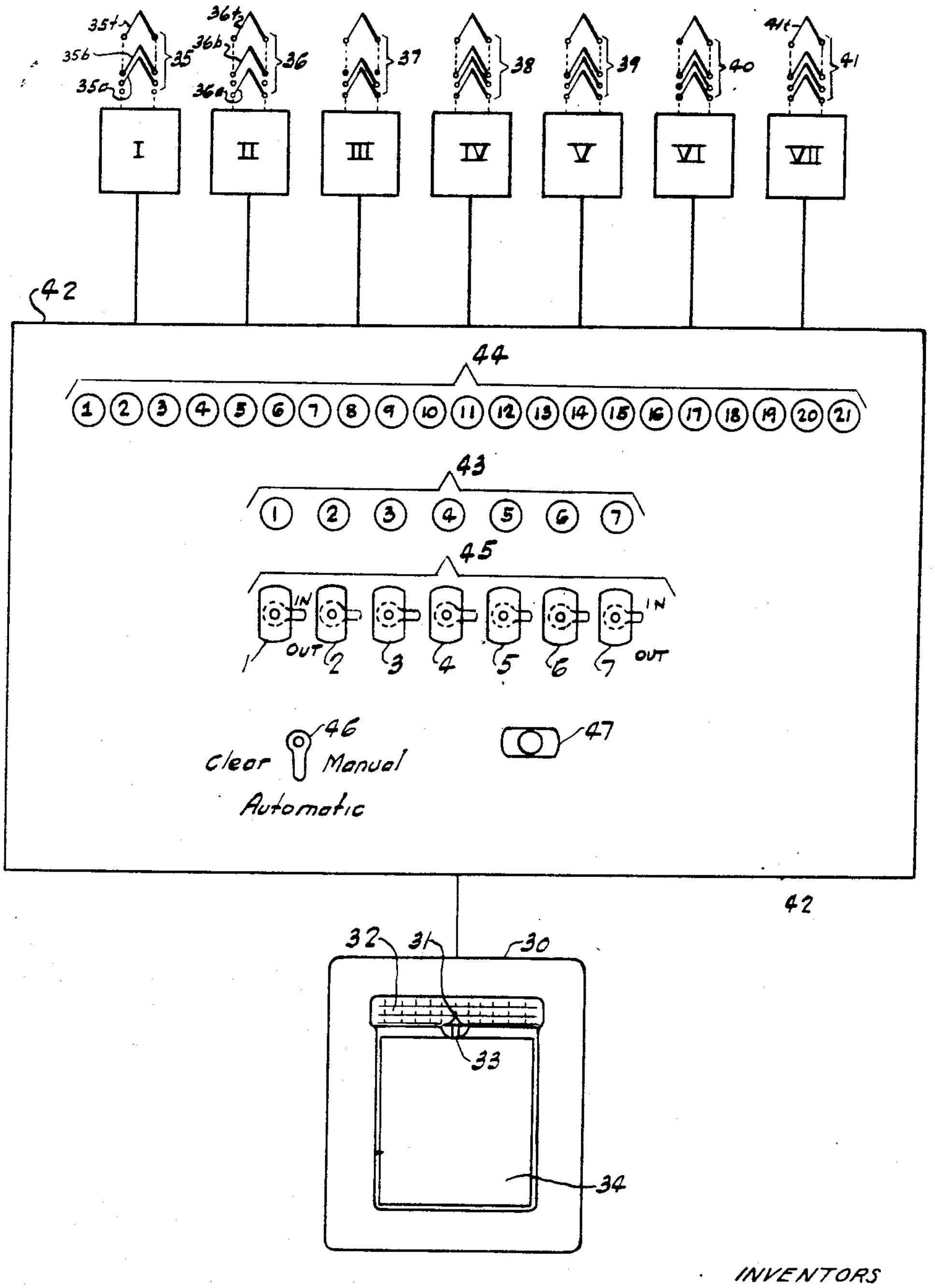

Referring to Fig. 1 of the drawings, the invention is diagrammatically illustrated as applied to the measurement and recording by a single instrument 30 of a large number of variable conditions or magnitudes, which may be pressure, rate of flow, voltage, current, power, chemical conditions, or temperature. The preferred form of recorder-indicator 30, though it may be of any suitable type, is similar to and in many respects the same as, the recorder-indicator now known to those skilled in the art under the tradename "Speedomax." A pointer 31 cooperates with a scale 32 to indicate the magnitude of each condition to be measured. A printwheel 33 movable with the pointer 31 serves to record on a calibrated chart 34 the magnitude of each condition.

Though the invention is applicable to other condition-responsive elements, it has been illustrated as including a plurality of groups or banks 35—41 of thermocouples. There are as many thermocouples in each said bank as the capacity or number of circuit-controlling contacts of each of the associated multiple-point stepping switches I—VII. In one embodiment of the invention, each switch, provided with banks of twenty-two circuit-controlling contacts, served to complete the circuit connections to twenty thermocouples, one hundred and forty for the seven switches.

In Fig. 1 the twenty thermocouples of bank 35 have been designated 35*a*, 35*b*, . . . 35*t*, the broken lines between thermocouples 35*b*—35*t* indicating the other seventeen thermocouples (not shown). The thermocouples of bank 36 have been similarly identified, while for clarity, the reference characters with subscripts *a*, *b*, *c* and *t* have been omitted for the remaining banks.

The manner in which the thermocouples may be connected to a measuring circuit in any desired sequence will be later explained in detail. Regardless of the order in which temperatures are indicated, provision is made clearly to show the particular thermocouple to which the system is connected. In the preferred form of the invention, this is accomplished by means of signal lights. In a switchbox 42, in which may be mounted the multiple-point stepping switches I—VII, signal lamps are disposed in a row 43 to illuminate numerals 1—7, each of which corresponds with the respective switches I—VII. In a second row 44, signal lamps serve to illuminate numerals 1—21. Twenty of the signal lamps of row 44 correspond with twenty of the thermocouples, whose circuits are under the control of each multiple-point stepping switch. The switchbox 42 may be located near, or remote from, the recorder-indicator 30. Preferably it is located so that both the rows 43 and 44 of the numeral indicators and the front of the recorder 30 are within view.

Figures 2, 2A:
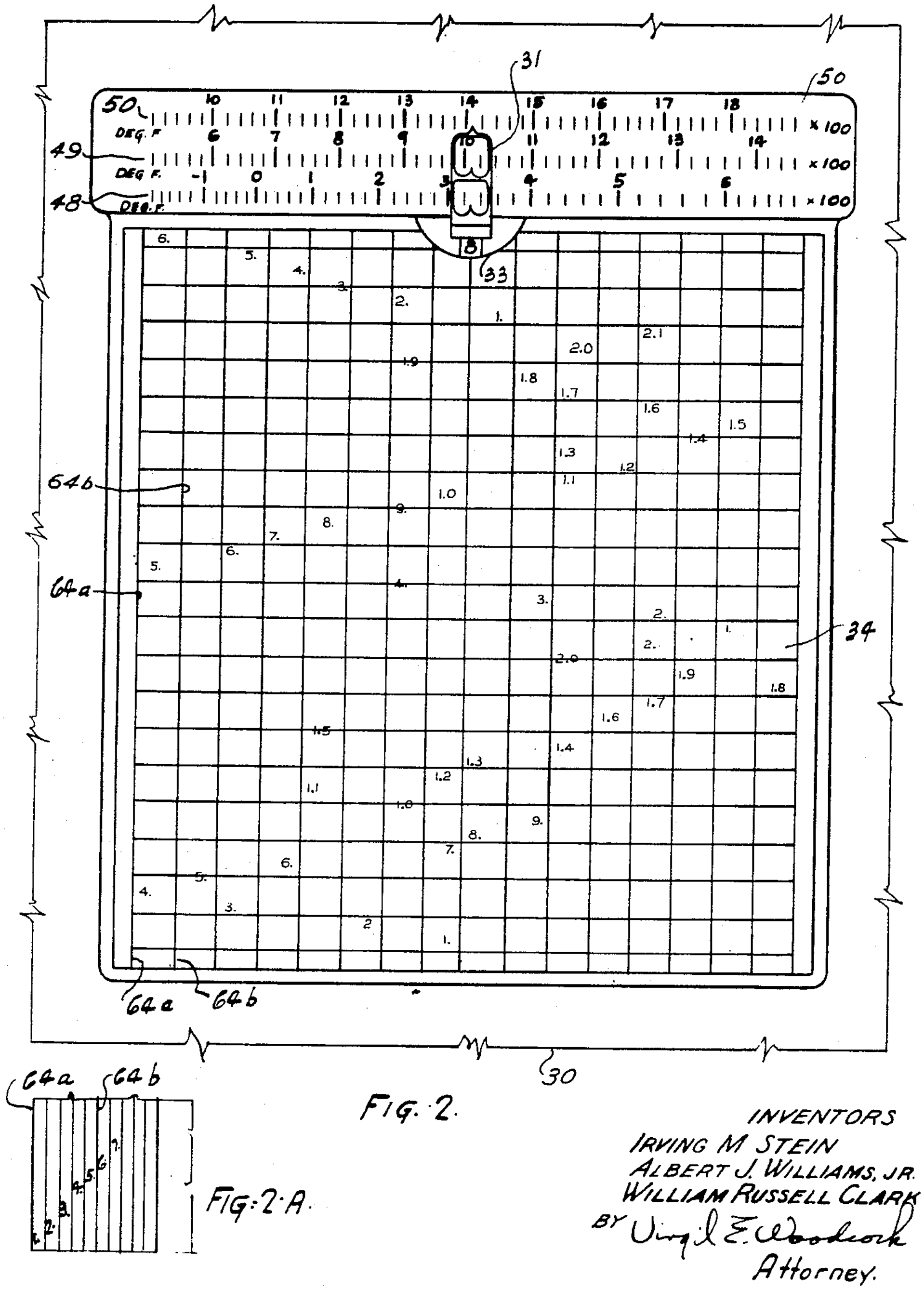

Also on the front of the switchbox 42 are located a row 45 of selector switches individually marked 1—7 to correspond with the switches I—VII, a 3-position switch 46, and a push-button switch 47. With the switch 46 in its illustrated "Automatic" position the temperatures to which the thermocouples are subjected are successively measured. For the first position of switch I, a bank-identifying operation of the recorder 30 is initiated. Hence, the illumination of numeral 1 of row 43 indicates the operations are under control of switch I, and the illumination of numeral 1 of row 44 indicates the recorder is connected to point 1 of switch I. This is a bank-identifying switchpoint instead of a thermocouple switchpoint. Under the control of the bank-identifying switchpoint, the recorder prints a symbol "1." indicating by its position on the chart the fact the switch I is effective. Like symbols "4.," "5." and "6." are shown in Fig. 2. All bank-identifying symbols are shown in Fig. 2–A. The dot following each symbol is not a decimal point but serves to mark on the chart the point where it is to be read. For example, for the symbol "2.1" the dot fixes the chart-reading position for symbol "2.1" with great accuracy.

After symbol "1." has been printed, the switch I then connects the first thermocouple 35*a* of bank 35 to the measuring circuit. At the same time, numeral 2 of row 44 is illuminated. The temperature of thermocouple 35*a* is then measured and recorded. The operation continues automatically until the temperatures of all twenty thermocouples of bank 35 have been recorded. The numerals 2—21, under control of switch I, are successively illuminated to show at all times the particular point under measurement.

After the measurement of the last of the thermocouples of bank 35, the circuit connections are automatically transferred to switch II. In the first position thereof, signal light No. 2 of row 43 is illuminated and signal light No. 1 of row 44 is illuminated. The temperature of the first thermocouple 36*a* is then measured and recorded. The second switchpoint of switch II is a bank-identifying point and while numeral "2" of row 44 is illuminated the recorder prints the symbol "2." in a distinctive position on chart 34.

The remaining thermocouples 36*b* to 36*t* inclusive are successively connected to the measuring circuit. Transfer is then made to switch III and thereafter, in succession, to switches IV to VII. The third, fourth, fifth, sixth and seventh positions of switches III to VII are respectively bank-identifying positions, and produce the symbols "3.," "4.," "5.," "6." and "7.," each in a distinctive position on the chart 34.

As shown in Fig. 2, the symbols "4.," "5." and "6." all appear near the left-hand margin of the chart 34 but each is differently spaced from the left-hand edge of the chart, the spacing being progressively greater for the larger bank-identifying symbols. Fig. 2–A is an enlarged view of a chart having division lines between the heavier lines 64*a* and 64*b* of Fig. 2 and illustrates all of the bank-identifying symbols located in the spaces between adjacent division lines. In practice, these symbols would not be as close together in the vertical direction as shown. They have been so illustrated the better to show the lateral spacing between them, which lateral spacing also appears for the bank-identifying numerals "4.," "5.," and "6.," of Fig. 2.

After the recording of the temperature of the last thermocouple 41*t* of switch VII, the circuits are transferred to switch I and a new cycle of operations is automatically initiated.

It will now be seen that the thermocouples of one or more banks may be grouped together, for example, on one airplane engine, while the thermocouples of other banks may be suitably located to measure all significant temperatures of the remaining airplane engines. For larger, multi-engined, planes, it may be desirable to locate each of switches I—VII adjacent the engine with which its thermocouples are to be associated. A feature of the invention is the flexibility which permits such remote location of the multi-point switches. In such cases, a cable of twisted pairs of copper and thermocouple-compensating lead wires extends between box 42 and each remotely located multi-point switch.

If at any time, or initially, it is desired to utilize less than all of the banks 35—41, corresponding switches of row 45 may be operated to exclude any of the banks. For example, by operating switches 1, 3, 5 and 7 to the "out" positions, the automatic cycle will be carried out under the control of multi-point switches II, IV and VI for the banks 36, 38 and 40 of the thermocouples. Any desired combination of switches may be included in, or excluded from, the automatic cycle.

On a trial flight of an airplane, or in experimental tests of any apparatus, it is frequently desirable closely to observe certain temperatures which at the moment may be of far greater importance than other temperatures. For such conditions of operation, it is only necessary to operate the switch 46 to the "Manual" position. Successive operations of a push-button 47 are effective instantly to transfer the measuring circuit from one thermocouple to the next thermocouple. For example, if the numeral 1 of row 44 and numeral 2 of row 43 are illuminated, it will be understood that the first thermocouple 36*a* of bank 36 is connected to the measuring circuit. If it is desired immediately to know the temperature corresponding to the numeral 20. it is only necessary rapidly to operate the push-button 47. On each operation of the push-button 47, the multi-point switch II will function to transfer the connections to the next thermocouple. As soon as the numeral 20 is illuminated, the recorder 30 will immediately indicate the temperature of the thermocouple corresponding with the twentieth position of bank 36. If the next temperature of importance corresponds with numeral 9 of switch V, it will be understood the selector switches 3 and 4 of row 45 will be moved to the "out" positions and the push-button 47 rapidly operated until numeral 5 of row 43 is illuminated and numeral 9 of row 44 is illuminated. The recorder 30 will then indicate the next temperature of importance. In this manner, the temperatures of any of the one hundred and forty thermocouples may be rapidly determined. Since under manual control, the operations follow one another in rapid succession and in any desired order, no attempt is made to keep the recorder in step. The indication of temperature is all that is desired and the symbols or numbers as recorded on the chart 34 during such operations are disregarded. Only the positions with respect to the scale are important.

At the end of a manual operation, fully automatic operation may be immediately resumed by moving the selector switch 46 to the "Clear" position. This produces rapid operation of all selected multi-point stepping switches until each occupies its position corresponding with the beginning of a fully automatic cycle. In this manner, the system is quickly cleared for fully automatic operation.

In the enlarged view, Fig. 2, of a fractional part of the recorder 30, the print wheel 33 is illustrated at the top of the recorder chart 34. The indicator 31 has three pointers, each of which cooperates with one of three scales 48, 49 and 50. The printwheel is provided with 21 numerals, corresponding in number with the twenty thermocouples controlled by each stepping switch. plus a numeral for the bank-identifying symbol. If the printwheel were provided with more numerals it will be understood that additional contacts might be provided on each stepping switch for the control of additional thermocouples, or vice versa. In this form of the invention, the number of thermocouples controlled by each stepping switch, plus one, corresponds with the number of numerals carried by the printwheel 33.

As already explained, the numeral "4." at the left of the chart 34 signifies that switch IV has been connected to the measuring system. Hence, the numerals "1." to "3." and "5." to "2.1" identify and correspond with the thermocouples controlled by the fourth multi-point stepping switch. In this manner, and during automatic operation, the numerals by their positions on the record chart indicate the magnitude of each temperature and they also identfy the thermocouples which have produced the particular readings appearing thereon. After the numeral "2.1" has been printed on the chart 34, the circuit connections are transferred to stepping switch V. The temperatures of the first four thermocouples of bank 39 are then recorded, as shown by numerals "1." to "4." The fifth position of switch V produces the printing of the symbol "5." in its distinctive bank-identifying position near the edge of chart 34.

As shown in Fig. 2, the foregoing operations have continued until the eighth position of stepping switch VI has been reached. This is evident since bank-identifying symbol "6." appears at the upper left-hand edge of chart 34 while the numeral "8." is visible through a mask in front of the printwheel 33. Hence, even before a printing operation, it can be observed from the instrument itself, that thermocouple 8 of bank No. 6 is connected to the measuring circuit.

It will be further observed that the scale 48 is calibrated for a temperature of from −200° F. to 700° F. The next scale 49 extends from 500° F. to 1500° F., while the scale 50 extends from 900° F. to 1900° F. For the measurement of temperatures over such a wide range, thermocouples of differing materials and characteristics are used. In accordance with the invention, provision is made for automatic compensation for a change from one temperature range to another temperature range.

Figure 3:
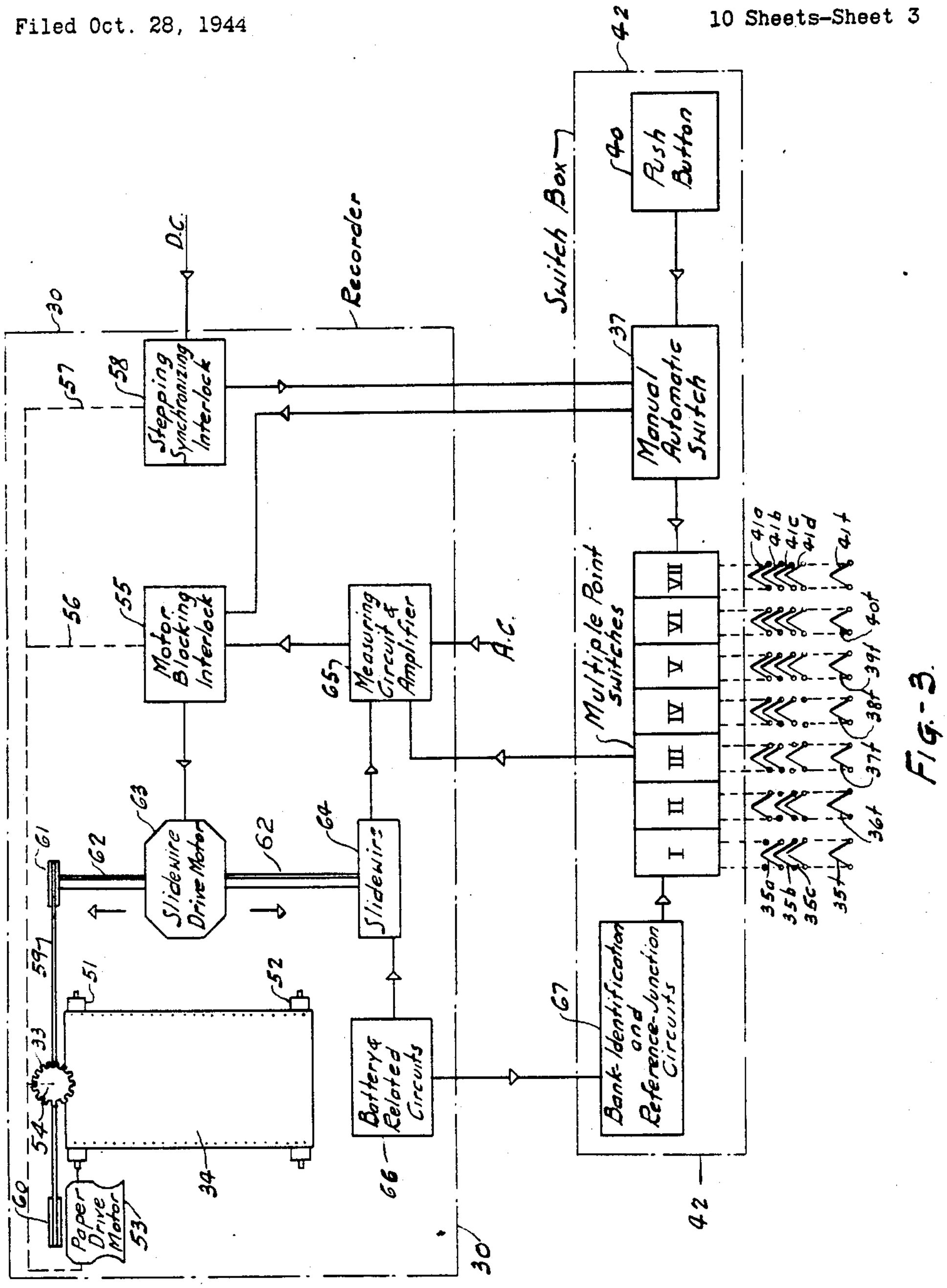

Referring to Fig. 3, additional important component parts of the invention are illustrated diagrammatically. The recorder chart 34 is illustrated together with the supply roll 51 and the takeup roll 52. The chart 34 is driven by means of a constant speed motor 53. This motor is also utilized to actuate the printwheel 33 for each printing operation, this mechanical connection being indicated at 54. The motor 53 also operates a motor-blocking interlock switch 55 as indicated by line 56 and, as indicated by line 57, it also operates a stepping and synchronizing interlock switch 58. The printwheel 33 and the associated indicators are slidable on a track under the control of a violin string 59 threaded over pulleys 60 and 61. The pulley 61 is secured to a shaft 62 driven by a motor 63, which motor also drives a slidewire 64 which forms a part of a measuring circuit 65.

Many structural features of the recorded 30 are disclosed in Ross et al. Patent No. 2,113,069. In that patent, however, the violin string and the slidewire are operated by a mechanical relay instead of directly by a motor.

Further, in accordance with the invention, there is provided a constant time-cycle of operation. Over ninety-two per cent of each complete cycle is utilized for balancing, thus insuring a relatively high degree of accuracy. The design is such that a time interval of 1.63 seconds is adequate to permit a complete null balance on each point regardless of whether successive points are at nearly the same temperature or whether they are at the extreme ends of the recorder chart. In consequence, it is unnecessary to group the thermocouples according to their temperatures. They may be grouped in any desired manner. For example, all of the thermocouples on one engine of an airplane may be grouped together and all of the thermocouples of another engine may be grouped together.

During automatic operation the thermocouples are connected in succession by the stepping switches I to VII to a suitable measuring circuit 65 which includes the slidewire 64 and related circuits 66 and 67. There is also provided an amplifier indicated at 65 which, through the motor interlock 55, energizes the balancing motor 63 for rotation in one direction or the other. A battery is also indicated at 66.

Whenever the manual-automatic switch 46 of Fig. 1 is moved to the "Manual" position, the stepping and synchronizing interlock 58 is effective to operate the motor interlock 55 so as to bring the motor 63 to standstill just prior to a printing operation of the wheel 33. This provision avoids any injury to the chart which might occur if the push-button 47 of Fig. 1 were operated at a time which would tend to produce movement of translation of the printwheel during a printing operation. In other words, the printwheel registers a record during each cycle. However, the push-button 47 may be operated at any time during such cycle. Should the printing operation and the movement of the balancing motor 63 tend to coincide, the interlocks 55 and 58 prevent such concurring movements. The printwheel 33 is held at standstill during a printing operation. The interlock 55, however, is only effective during manual operation and during the first printing operation of the following automatic cycle.

Figure 4:
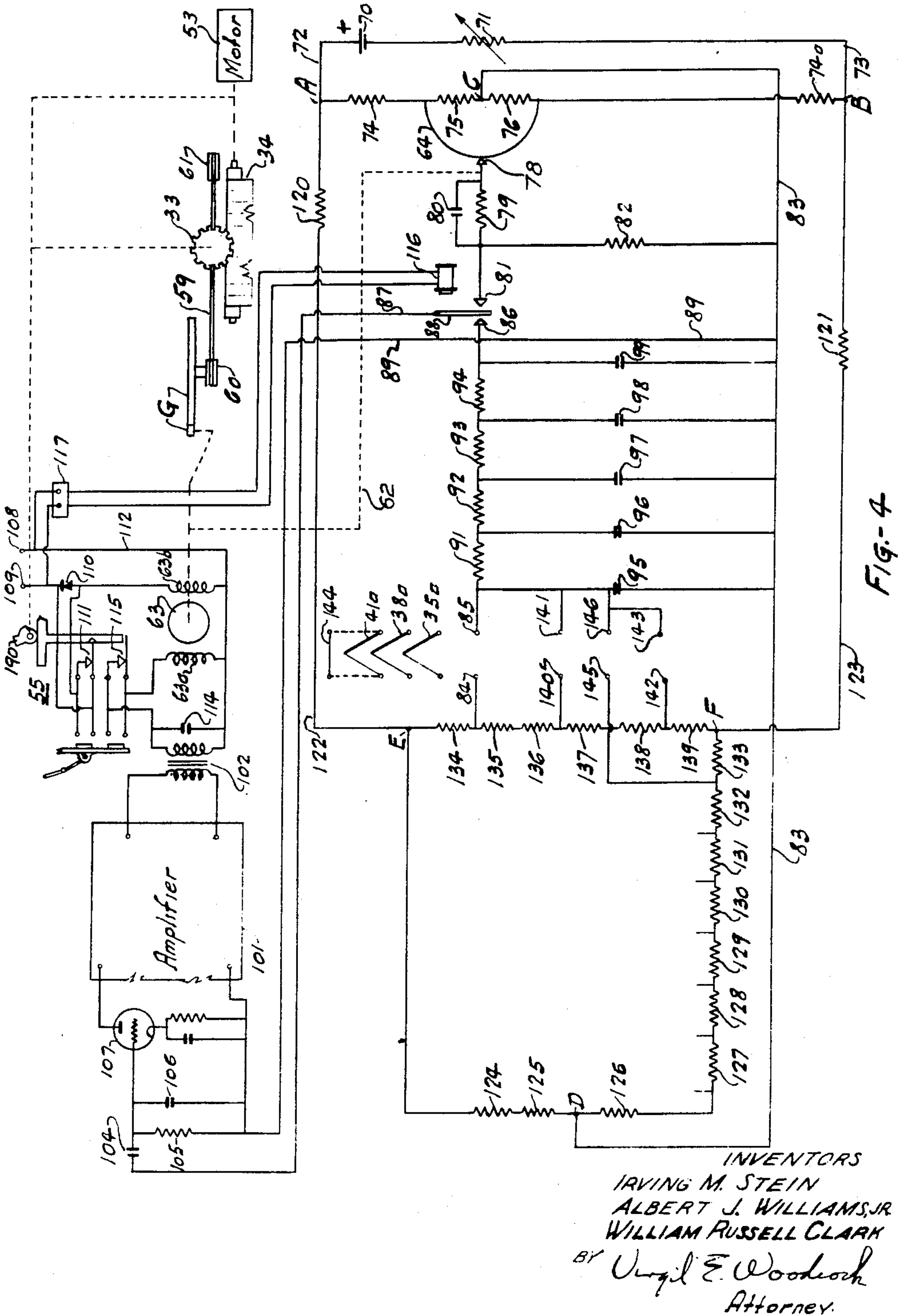
Fig. 4 illustrates the measuring circuit and compensating network together with other apparatus and circuits.

The measuring circuit and certain additional elements of the system are illustrated in Fig. 4. This circuit comprises a potentiometer of the split-circuit type and includes a battery or other constant direct current source of supply 70, in series with an adjustable resistor 71, which applies a potential to conductors 72 and 73. Across these conductors extends a circuit including resistors 74 and 74*a* connected in series with resistors 75 and 76, across which is the slidewire 64. The contact 78 of the slidewire is connected through a resistor 79 and capacitor 80 to a stationary contact 81 of vibrator 88. A resistor 82 extends from the contact 81 to a conductor 83 which leads to the juncture, marked C, of resistors 75 and 76. A selected thermocouple 35*a* may be connected in the circuit by means of the contacts 84 and 85. Thus, upon operation of selector switch I of Fig. 1 to its second position the thermocouple 35*a* is connected to contacts 84 and 85. The potential difference then introduced into the circuit by the thermocouple 35*a* appears between a stationary contact 86 of vibrator 88 and the conductor 83. A conductor 87 is connected to the movable arm of vibrator 88 while a second conductor 89 is connected to conductor 83. When the movable arm 88 is against stationary contact 81, a voltage of a predetermined magnitude, depending upon the relative position of contact 78 with respect to slidewire 64, appears between conductors 87 and 89. Similarly, upon movement of arm 88 against contact 86, the potential difference from, or the voltage of, the thermocouple 35*a* appears between conductors 87 and 89. The slidewire motor 63 operates to move the slidewire 64 to a position such that the potential difference between contact 81 and conductor 83 is equal to the potential difference appearing between contact 86 and conductor 83.

The relative position of the contact 78 with respect to the slidewire 64 represents the amount of resistance necessary to produce a potential difference to equal that developed by the thermocouple 35*a*. Hence, the position of the slidewire 64 may be calibrated in terms of potential difference, or as shown in Fig. 2, the scale on the record chart 34, or the one with which the indicator 31 cooperates, may be calibrated in terms of the temperature being measured.

The movable arm 88 in operating between contacts 86 and 81 produces a comparison of the respective potential differences and a resulting operation of motor 63 to operate the slidewire 64 until the two potential differences are equal.

An anticipatory control includes a shunting resistor 82 which produces an IR drop between contact 81 and conductor 83 which, of course, is a function of the current flowing therethrough. This current has a fixed value depending on the size of resistor 79 and the position of the contact 78 with respect to the slidewire 64. The current through the resistor 82 also depends upon the rate of relative movement between the contact 78 and the slide wire 64. The magnitude of this component of current, which flows through the capacitor 80, varies with the rate of change of the resistance of slidewire 64. Hence, it serves as an anticipatory means for bringing the slidewire to a position of balance without overtravel. For example, when the slidewire is moving rapidly in either direction the potential difference across the resistor 82 is materially different than it would be if the slidewire were moving slowly. This means that a higher potential difference is produced between contact 81 and conductor 83. Therefore, the potential difference from the thermocouple 35*a* will be balanced by the potential difference across the resistor 82 prior to the time the slidewire 64 attains its final position. However, as balance is approached the speed of the slidewire 64 decreases and the magnitude of the component of current through the capacitor 80 correspondingly decreases. As balance is approached, the additional potential difference due to the current through the capacitor 80 disappears. In consequence, balance is attained with the slidewire 64 moving at slow speed, a speed not great enough for overtravel to occur.

For a more detailed explanation of the anticipatory control features, reference may be had to the co-pending application of Albert J. Williams, Jr., Serial No. 457,845, filed September 10, 1942, and entitled "Electrical Measuring Systems," now U. S. Patent 2,367,746, issued Jan. 23, 1945.

The network, comprising series-resistors 91—94 and shunting capacitors 95—99, provides a convenient means for filtering or removing from the measuring system voltages which may be induced in the several loops of the measuring circuit.

In one embodiment of the invention, the resistors 91—94 each had a resistance of 5000 ohms while the capacitors 95—97 each had a capacity of four microfarads. The capacitors 98 and 99 each had a capacity of 1.7 microfarads. In the same embodiment of the invention the resistor 71 had a resistance of from 8 to 10 ohms while resistors 82 and 79 were each 20,000 ohms. The capacitor 80 was 4 microfarads.

It will be remembered the potential differences produced by the thermocouple 35*a* and by the potentiometer are alternately applied to conductors 87 and 89. These conductors form a part of the input circuit to an amplifier 101, the output of which is through a transformer 102 applied to a field winding 63*a* of motor 63. The input circuit includes a coupling capacitor 104, a resistor 105 and a capacitor 106 in parallel with the input circuit. A conventional resistor and capacitor in the grid-cathode circuit provides a negative bias for the grid of the amplifier tube 107. It will be understood the amplifier 101 may be conventional with as many stages of amplification as a particular application of the invention requires.

The motor 63 is shown as an induction motor having two windings, the winding 63*a* being connected to the secondary winding of the output transformer 102 while a winding 63*b* is connected across a suitable source of alternating current indicated by the terminals 108 and 109. This latter circuit may be traced from terminal 109 to one side of a rectifier 110 which is bypassed by closed contacts 111 of the interlock 55, winding 63*b*, and by conductor 112 to the other supply terminal 108.

The vibrator or movable arm 88 is actuated by a coil 116 energized from the source 108—109, through a phasing capacitor or network indicated by the rectangle 117. The vibrator 88 is operated between stationary contacts 86 and 81 in timed or proper phase relation with the alternating current energization of the motor winding 63*b*.

When the potential from the potentiometer or measuring circuit exceeds that of the thermocouple and its associated circuits, the amplifier 101 produces an output current in the primary of transformer 102 which causes the motor 63 to rotate in one direction. The capacitor 114 connected across the secondary winding of the transfer 102 is desirable to increase the effective current circulating through the motor winding 63*a*. This capacitor 114 is adjusted to tune to resonance at the operating frequency, the output circuit including winding 63*a*.

When the potential difference across the thermocouple and its associated circuits is greater than that from the potentiometer, the amplifier 101 produces a current which is opposite in phase from that due to the condition where the potentiometer circuit had the higher potential difference. Consequently, the motor 63 operates in one direction when one potential difference is higher and it operates in the opposite direction when the other potential difference, for example, that from a thermocouple, is higher. In other words, the vibrator 88 connects first one circuit and then the other circuit to the input of the amplifier 101. The tube 107 is responsive not only to the difference of the potential differences but also to the direction of their difference. As long as such potential difference exists in one direction the motor 63 continues to rotate in one direction. When the potential difference disappears, the motor stops. Whenever the potential difference reverses in direction the motor also reverses its direction of rotation.

A mechanical connection 62, between motor 63 and the slidewire 64, Figs. 3 and 4, serves to produce relative movement between it and the contact 78 so as to make the potential difference derived from the potentiometer equal to that of each thermocouple. This mechanical connection is so arranged as to eliminate all backlash. When the potential differences are equal, there is no output from the amplifier 101 and the motor 63 remains at standstill. Each balancing operation consists in the movement by the motor 63 of the slidewire 64 to a position where balance is achieved. Hence, the relative position of the slidewire 64 and the contact 78 is indicative of the magnitude of the potential difference developed by each thermocouple. The motor 63 is also utilized to drive through suitable gearing G, the violin string 59 which translates the printwheel 33 and its associated indicating mechanism relative to the chart 34.

Returning to the measuring circuit itself, it will be understood by those skilled in the art that the E.M.F. or potential difference of a thermocouple depends upon the temperatures of its hot and cold junctions. Because of the change in the ambient, or air temperature, the temperature of the cold junction varies. In an airplane, this change may be very great, of the order of the difference in temperatures encountered in low level and stratospheric flights. Further complicating the difficulty is the need to use thermocouples of differing materials for the different ranges of temperature. For example, for temperatures of the hot junction ranging from 150 degrees below zero to 650 degrees above zero, copper-constantan thermocouples will be satisfactory. For the range of from 550° F. to 1437° F. Chromel-Alumel thermocouples are preferred; while for the range of from 950° F. to 1885° F. high temperature Chromel-Alumel thermocouples are utilized.

The operating characteristics of the copper-constantan thermocouples differ from the Chromel-Alumel thermocouples, that is, the change in the E.M.F. or potential difference for given changes in the hot and cold junction temperatures substantially differ.

In accordance with the present invention, provisions are made not only for automatic range-changing but also for automatic compensation for variations in the cold junction temperature of each thermocouple regardless of the contrasting materials of which it is composed.

Further in accordance with the invention, control features are combined with the cold junction compensating network to produce recording of the bank-identifying symbols in distinctive positions on the recorder chart. The invention also includes the use of the single unidirectional source 70 for both the measuring and compensating networks.

More specifically, it will be observed the potential of the battery source 70, through conductors 72 and 73, resistors 120 and 121, and conductors 122 and 123, is applied to the additional compensating network. This network, in the form of a Wheatstone bridge, includes a resistor 124 of nickel and copper (60 ohms) and a resistor 125 of "manganin" (244 ohms) in one arm or branch of the circuit. In another arm, there is a resistor 126 of "manganin" (16 ohms), bank-identifying resistors 127–132 of "manganin" (2 ohms each), and resistor 133 of "manganin" (278 ohms). The third and fourth arms or branches of the circuit include resistor 134 of "manganin" (304 ohms), resistor 135 of "manganin" (150 ohms), resistor 136 of nickel and copper (0.3 ohm), resistor 137 of "manganin" (0.93 ohm), resistor 138 of nickel and copper (0.3 ohm) and resistor 139 of nickel and copper (59 ohms).

The relative values of the resistors are so selected that the following voltage relationship exists:

$$\frac{E_{AC}}{E_{CB}}=\frac{E_{AD}}{E_{DB}}$$

This relationship does not depend upon the interconnection of points C and D by conductor 83. The stated voltage relationship will exist in the absence of this interconnection. Stated differently, the voltage between the points A and C of the potentiometer bears the same ratio to the voltage between points B and C as the voltage between points A and D of the compensating network bears to the voltage between points B and D. These voltage ratios will be equal with a resistor 74 of 19 ohms, resistor 75 of 0.87 ohm, resistor 76 of 0.13 ohm, resistor 74a of 3 ohms, resistor 120 of 4940 ohms and resistor 121 of 755 ohms. The stated resistances are illustrative and correspond with the values used in one embodiment of the invention. Other values, of course, may be used but the aforesaid ratios should be maintained.

It will be observed the battery 70 applies a potential difference to the bridge at the junctures E and F. The juncture D at the opposite diagonal of the bridge is connected by conductor 83 to the point C common to resistors 75 and 76. The remaining juncture is selected by the multiple-point stepping switches as schematically indicated in Fig. 4.

Heretofore, the measurement from a distance of the potential difference of remotely located thermocouples has required special precautions to insure uniform resistance of all circuits interconnecting the thermocouples and the measuring circuits. Because of the variable resistance which is characteristic of cable-connectors of the sliding contact type their use has been considered undesirable by those skilled in the art.

In accordance with the present invention, cable-connectors of conventional sliding-contact design may be satisfactorily employed notwithstanding the fact that they may introduce resistance into the respective circuits completed through such connectors. This desirable result is accomplished by the provision of relatively high-value resistors 120 and 121 in the lead wires 122 and 123 which extend to the compensating network D—E—F. By materially increasing the resistance of these circuits, the percentage change, due to the variable contact resistance of the sliding-contact type of connectors, is small compared with the resistance of the circuit as a whole. Additionally, the aforesaid ratios between points A, B, C and D provide an electrical balance between the compensating network and the measuring circuit or network. Ideally, a perfect balance is established between the two networks. However, this balance need not be perfect by reason of the provision of the conductor 83 which interconnects the points C and D. Even with some unbalance present, the compensating current flowing in the conductor 83 will be of a very small order. It is so small, of the order of microamperes, that any substantial resistance change therein, due to a sliding type of connector, does not disturb the balance between the two networks.

With the foregoing provisions in mind, it will be observed from Fig. 3 that the battery, the slide-wire, the measuring circuit and amplifier may be located in the recorder box 30 together with the recording mechanism, the motor-blocking interlock and the stepping synchronizing interlock. The switchbox 42 may be remotely located with respect to the recorder and may contain the bank-identification and reference junction circuits, also referred to herein as the compensating network. The box 42 may also contain the seven multiple-point stepping switches, the manual-automatic switch, the push button, as well as the signal lights, and the "in" and "out" switches illustrated in Fig. 1. The thermocouples are cable-connected to the contacts of the multiple-point switches. The several additional conductors required to interconnect the component parts of the system may be conveniently included in cables which terminate in connector blocks, each provided with sliding contact members which cooperate with corresponding contact members located at the multiple-point stepping switches and at the recorder. These connectors may be of the plug and socket type and, in general, are of the type where one contact member slides against the other to insure a relatively good electrical connection.

In accordance with the invention, again referring to Fig. 4, all of the copper-constantan thermocouples are connected between the contacts 84 and 85. Hence, the thermocouple potential difference appearing between contact 86 and conductor 83 depends upon the difference between the temperatures of the hot and cold junctions of the thermocouple 35a and the resistance values in the respective arms of the bridge or compensating network. For the copper-constantan thermocouples the resistances of the nickel-copper resistors 124, 136, 138 and 139 change with the ambient or cold junction temperature properly to correct for the changes in temperature of each cold junction.

The other resistors, as already noted, are of "manganin," a material having a property of substantially constant resistance regardless of its temperature, within the usual ranges of ambient temperature, that is to say, "manganin" has a substantially zero temperature coefficient.

For an easy understanding of the principles of the invention, the thermocouple 35a has been described as consisting of copper-constantan. The next thermocouple 38a will be assumed to consist of Chromel-Alumel for the measurement of temperatures within the range of from 550° F. to 1437° F. Provisions are made for automatic transfer of the circuit connections so that each Chromel-Alumel thermocouple, such for example as thermocouple 38a, is connected across the contacts 140 and 141. This automatically changes the correction introduced by the Wheatstone bridge network by transferring the nickel-copper resistor 136 as well as the "Manganin" resistor 135 from one arm of the bridge to another arm of the bridge. This simple range-changing feature automatically takes care of the difference in the characteristics of the thermocouple 38a from that of the preceding thermocouple 35a.

A high temperature Chromel-Alumel thermocouple 41a is illustrated above thermocouple 38a. The circuit connections are such as to connect the thermocouple 41a across the contacts 142 and 143. This range-changing connection transfers additional resistance, the nickel-copper resistor 138 and the "manganin" resistor 137 from one arm of the bridge to the arm in which resistors 135 and 136 were transferred. Again, this transfer of resistance produces automatic and accurate compensation for the differing characteristics of the high temperature Chrome-Alumel thermocouple 41a and other like thermocouples.

As schematically illustrated in Fig. 4, it will be understood the circuit connections may be such as to include in succession a plurality of thermocouples formed of one material, followed by the connection of a plurality of additional thermocouples formed of another material, and so on, depending upon the range of temperatures and the character of the thermocouples required for particular applications. Instead of connecting the thermocouples in sequence, to the measuring and compensating networks, it is to be further understood that a high temperature thermocouple may first be connected to the circuit, or any of the thermocouples may be connected thereto in any desired sequence. It is only necessary to insure that they be connected to the proper contacts so that the proper corrective voltage is introduced by the compensating or corrective network.

In order to produce the printing of a symbol on the chart 34 in a distinctive position which will indicate the particular group of thermocouples connected or to be connected to the compensating and measuring networks, the compensating network is so utilized as to produce a distinctive placement of a symbol on the recorder chart. This is accomplished by completing a circuit, as by a conductor 144 across contacts 145 and 146. When this connection is completed, it will be observed there is a further change in the resistors connected between the respective arms of the Wheatstone bridge circuit. Instead of a connection being completed between the points F and E as in the case of the thermocouples, the connection of the conductor 144 across the terminals 145 and 146 completes a connection between resistors 132 and 133.

In one form of the invention, the resultant potential difference applied to the measuring circuit was of a very low order. It was so selected, by suitable selection of the resistance of the resistor 133, as to produce the printing of the symbol "1." at the extreme left-hand portion of the chart, as viewed in Fig. 2. For the second identifying point, a circuit is completed from the terminal 146 to the conductor which extends upwardly between the resistors 131 and 132. A slightly higher potential difference is then applied to the measuring circuit and thus produces the printing of the symbol "2." somewhat to the right of the previous symbol "1.". Similarly, each stepping switch includes connections for the completion of similar bank-identifying circuits respectively located between the resistors 131—130, 130—129, 129—128, 128—127 and 127—126.

The selector or multiple-point stepping switches themeselves, though they may be of any suitable type, are preferably of the type disclosed in Forsberg et al. Patent No. 1,472,465. Switches as disclosed in this patent have been widely used in telephone systems and their construction and operation are well known to those skilled in the art. Therefore, they have been diagrammatically represented in the drawing. Reference may be had to said patent for constructional details.

Figure 5:
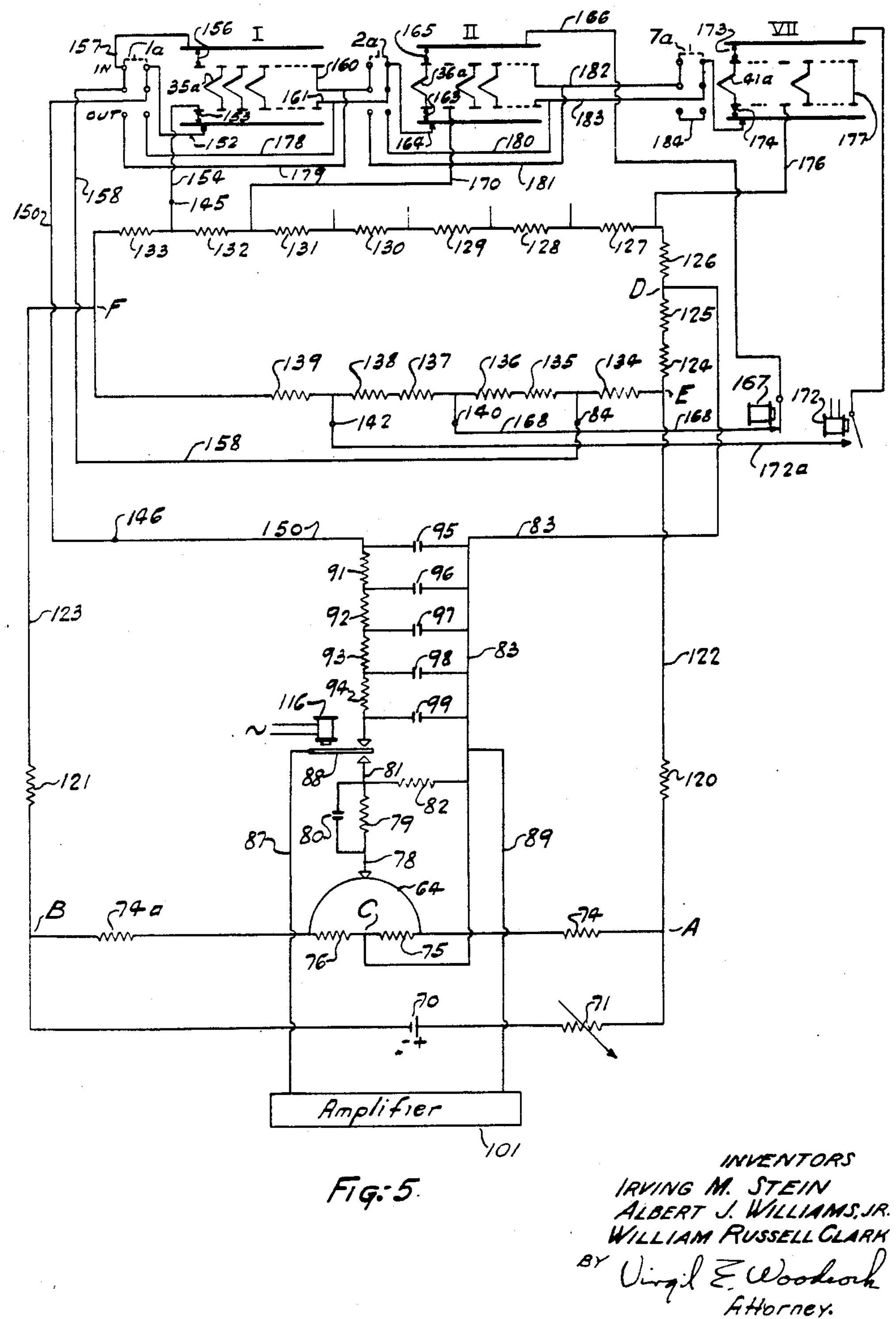
Fig. 5 illustrates the measuring circuit, the compensating network, three of the seven banks of switches and the manner in which they function to produce distinctive registration of bank-identifying symbols.

Referring to Fig. 5, three of the multiple-point switches corresponding with switches I, II and VII have been in part diagrammatically illustrated in conjunction with the system of Fig. 4. With each stepping switch in its first or No. 1 position, it will be observed the potentiometer measuring circuit is connected by way of conductor 150 to the bank-identifying point between the resistors 132 and 133 in lieu of its connection to a thermocouple. This circuit may be traced from conductor 150 through the right-hand side of double-pole double-throw switch 1a, conductor 152, to one side of one deck of multiple-point switch I, through the bridging arm 153, and by conductor 154 to the bank-identifying circuit. For easy correlation with Fig. 4, this conductor 154 includes the terminal 145 and the conductor 150 includes the terminal 146. The other side of the measuring circuit is at all times connected to the point D by the conductor 83.

As already described, the vibrator coil 116 operates the armature 88 alternately to apply to the amplifier 101 the potential difference across the potentiometer and the potential difference across the measuring circuit. As already explained, the amplifier output is applied to the motor 63, Fig. 4, to move the slidewire 64 to a position in which the two potential differences are equal. This balancing operation is completed in a very short interval of time following which the printwheel 33 is caused to print numeral "1." in its distinctive position along the left-hand side of the chart.

As already stated, this symbol or numeral "1." may have any desired unique position on the chart 34. It may be to the left of numerals "4," "5." and "6.". As indicated in the enlarged view of Fig. 2–A, the chart itself may have a number of division lines intermediate the heavier division lines, such as 64a and 64b. In the preferred form of the invention, each bank-identification symbol may be printed intermediate adjacent division lines. Thus, as shown in Fig. 2–A, the respective symbols "1." to "7." each appear between the adjacent division lines. In Fig. 2–A, these numerals appear close together. They are so shown for convenience in drawing. In actual practice they would appear on the chart 34 after the printing of numeral 21, and after the printing of the numerals preceding the bank-identifying numeral, in the manner illustrated in Fig. 2 for bank-identifying symbols "4.," "5." and "6.". The vertical spacing between them will depend upon the speed at which the record chart 34 is driven.

In manner later to be described, after the printing of the bank-identification symbol "1." the multiple-point stepping switch I is operated to its second or No. 2 position. It will be observed, Fig. 5, the bridging member 153 is then effective to complete a circuit from one side of the thermocouple 35a to the conductor 150 leading to the measuring circuit. At the same time, a second bridging member 156 of the switch I completes a circuit from the other side of the thermocouple 35a through conductor 157, the left-hand side of the double-pole switch 1a, and by way of conductor 158 to the terminal 84 and the juncture between the resistors 134 and 135. Hence, it will be seen that these connections are completed in exactly the same manner as diagrammatically illustrated by the connection of the thermocouple 35a in Fig. 4 between the terminals 84 and 85. After the measurement of the potential difference produced by the thermocouple 35a, the printwheel 33, already advanced to its second position, prints on the chart 34 the symbol "2." in a position with respect thereto which is indicative of the magnitude of the temperature to which the thermocouple 35a has been subjected.

The system continues automatically to measure and to record the temperatures of all of the thermocouples under the control of the stepping switch I. As already indicated, this switch may be provided with twenty contacts for controlling a like number of thermocouples. After the last thermocouple has been connected to the measuring circuit, the switch I operates to its final position. In such position, the bridging members 153 and 156 complete circuits through conductors 161 and 160, respectively, to the next multiple-point stepping switch II. This last switch-transfer position accounts for the twenty-second position of switch I.

The foregoing transfer of the circuit is completed through a double-pole double-throw switch 2a. It will be seen that the last point on switch I corresponds with the first point on switch II. In other words, as soon as switch I is moved to its last, for example its twenty-second position, the thermocouple 36a is connected to the measuring circuit. One side of this circuit may be traced from the thermocouple 36a through bridging member 163, conductor 164, the right-hand side of the double-throw switch 2a, conductor 161, bridging member 153, conductor 152, the right-hand side of switch 1a, and by conductor 150 to one side of the measuring circuit. The remaining part of the circuit may be traced from the other side of the thermocouple 36a by way of bridging member 165, conductor 166, contacts of a relay 167, conductor 168, terminal 140, and to the juncture of resistors 136 and 137. The relay 167 is controlled by an operating circuit, later to be described, which is energized as the foregoing circuit is completed for the thermocouple 36a. The energization of the relay 167 serves automatically to connect the thermocouple 36a to the juncture between resistors 136 and 137 instead of between the resistors 134 and 135. As already explained, this change in the connections introduces a different voltage-correction. Hence, the thermocouples under the control of the stepping switch II may comprise Chromel-Alumel thermocouples, of a differing temperature range from those under the control of the stepping switch I.

After the measurement of the temperature of thermocouple 36a, the multiple-point switch II is advanced to its second or No. 2 position. This is the bank-identifying position in which the bridging member 163 completes a bank-identifying circuit in lieu of a thermocouple measuring circuit, which bank-identifying circuit extends from the juncture of resistors 131—132, through the conductor 170, bridging member 163, conductor 164, the right-hand side of the switch 2a, conductor 161, bridging member 153, conductor 152, switch 1a, and by conductor 150 to the measuring circuit. As a result of this change in connections the print-wheel, which then is in its No. 2 position, is caused to print the bank-identifying symbol "2." in the second space, just to the right of the one in Fig. 2–A in which the symbol "1." was previously printed. Thereafter, the system functions automatically to record the temperatures of the remaining thermocouples under the control of switch II.

It will now be understood that as many banks as may be desired may be connected to the measuring circuit and that these may operate in succession to control any desired number of thermocouples. These additional multiple-point switches may control thermocouples of the same or differing characteristics. As illustrated by the stepping switch VII, thermocouples for a still different temperature range may be connected to the measuring circuit. As the preceding bank is operated to its last position, another relay 172 is energized to connect the bridging member 173 of switch VII to the juncture between resistors 139 and 138. Thus the first thermocouple 41a is connected to the bridging member 173 and thence by relay 172, conductor 172a and terminal 142 to resistors 138 and 139. The other side of the thermocouple is connected to the measuring circuit 150 through the double-pole double-throw switch 7a and through the preceding multiple-point stepping switches.

If there are seven multiple-point switches, as previously indicated, then in the seventh position of switch VII a circuit is completed by the bridging member 174, through conductor 176 to the juncture of resistors 126 and 127. As already described, the printwheel is then operated to print the symbol "7." in the seventh space, Fig. 2–A, from that occupied by the numeral "1.". In the last position of the last multiple-point switch, it will be observed that a conductor 177 interconnects the contacts of the switch corresponding with those between which the thermocouples are connected. This connection is momentarily maintained inasmuch as the multiple-point stepping switches, through circuits later to be described, are immediately operated to their first positions for the beginning of a further cycle of automatic operations.

The double-pole double-throw switches 1a, 2a, and 7a respectively correspond with the "in" and "out" switches 1, 2 and 7 of Fig. 1. Thus, when the double-pole switch 1a is moved to its "out" position it will be observed the multiple-point stepping switch I is removed from the circuit. The conductors 150 and 158 are then connected directly to conductors 178 and 179 which lead to the next switch 2a. After the switch 2a is operated to its "out" position the multiple-point switch II is likewise removed from the circuit and the connections are then transferred through conductors 180 and 181 to conductors 182 and 183 which lead to the next double-throw switch, shown as switch 7a. In this manner, it will be seen that any one of the several stepping switches I-VII, Fig. 1, may be included or excluded from the circuit. Automatic operation is not affected. The effect is to predetermine the particular stepping switches and their thermocouples which shall be included in the automatic cycle of operations. It may be further observed that the "out" position of the switch 7a has a conductor 184 bridging its contacts. This conductor serves the same purpose as the conductor 177 and prevents the occurrence of an open circuit when the preceding stepping switch is operated to its last position.

Figure 6:
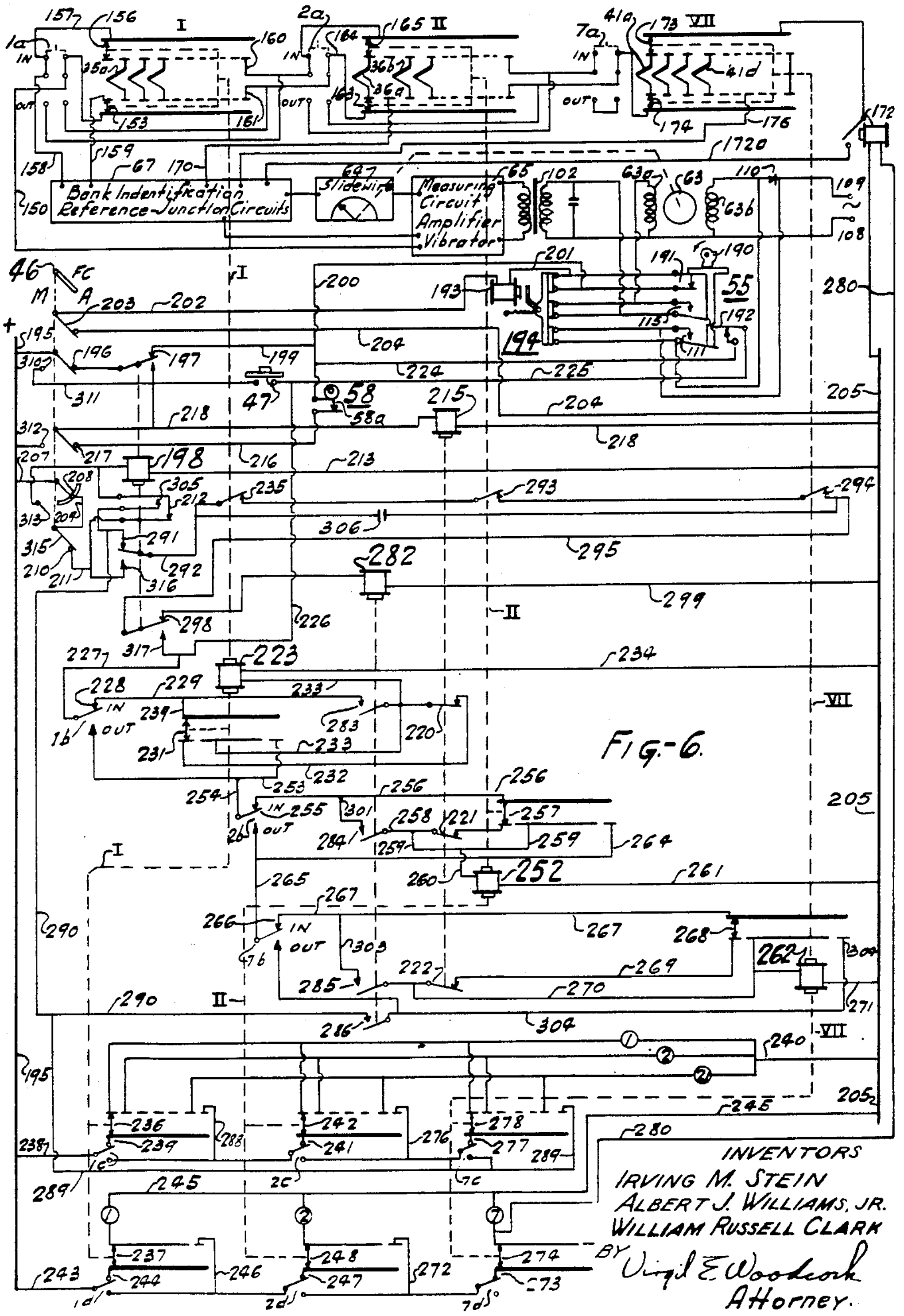
Fig. 6 illustrates the system as a whole with details of the measuring circuit and of the compensating networks omitted.

Referring to Fig. 6, three of the seven multiple-point stepping switches have again been illustrated together with a detailed wiring diagram of the control circuits forming a part of the invention.

As will be readily understood by reference to said Forsberg et al. Patent No. 1,472,465, each stepping switch may include a plurality of contact decks, each with corresponding circuit-controlling contacts. For example, in Fig. 6 the switch I is diagrammatically shown with its operating coil 223 connected by broken lines to bridging members or brushes 153 and 156 of the thermocouple contact decks. Other decks of switch I include bridging members or brushes 231, 236 and 237. This switch also includes contacts 235 which are opened whenever coil 223 operates the switch mechanism to a position preparatory to the next switching operation.

Similarly, the selector switch 46 is provided with a plurality of circuit-controlling contacts and each of the "in" and "out" switches 1, 2 and 7 are provided with additional circuit-controlling contacts identified by added subscripts a, b, c and d.

For ease in understanding the operation of the system, it will be assumed each multiple-point stepping switch I, II and VII occupies its first or No. 1 position. Further, that the selector switch 46 is in its "A" or "Automatic" position. It will be recalled, from the description of Fig. 3, that the motor-blocking interlock 55 and the stepping and synchronizing interlock 58 are each actuated or driven by the motor 53. Though any suitable constant speed motor may be utilized, it is convenient to make use of the constant speed motor 53, Fig. 4, which also serves to drive or to advance the recorder chart. During the time that each stepping switch is in its first position, the stepping and synchronizing interlock 58, which in Fig. 6 is illustrated as a simple circuit controller, completes a circuit through its contacts 58a. The motor-blocking interlock 55 comprises a 3-level cam 190, Figs. 6 and 7, which moves a contact operating member to open and close its associated contacts 111, 115, 191 and 192. For the low level 190a, contacts 111 and 115 are closed and contacts 191 and 192 are open. For the intermediate level 190b, all of the contacts are open, while for the high level 190c, the contacts 111 and 115 are open and the contacts 191 and 192 are closed.

As shown in Fig. 6, the cam 190 has been operated to close the switch contacts 191 and 192, while switch contacts 111 and 115 remain open. The operating coil 193 of the motor-blocking switch 194 is energized through a circuit which may be traced from the positive supply line 195 through contact 196 of selector switch 46, contact 197 of a relay 198, conductors 199 and 200, through the contacts 191, conductor 201, the operating coil 193, conductor 202, contact 203 of selector switch 46, and by conductor 204 to the negative side 205 of the source of supply. The coil 193 thereupon closes the motor-blocking switch 194, the upper contacts of which serve to complete a holding circuit for the continued energization of coil 193 regardless of the subsequent opening of initial circuit through the contacts 191. The motor-blocking switch 194 includes three pairs of contacts which are simultaneously opened and closed to interrupt and complete bypass circuits around contacts 191, 115 and 111.

The relay 198 is energized through a circuit which will be later traced. As illustrated, this relay 198, in the energized position, completes its own holding circuit which may be traced from the supply line 195, by conductor 207, contact 208, conductor 209, contact arm 315, contact 210, conductor 211, contact 212 of relay 198, the operating coil of relay 198, and by conductor 213 to the other supply line 205.

A synchronizing relay 215 is also energized through a circuit which may be traced from the supply line 195, by contacts 196, contacts 197 of relay 198, conductor 199, synchronizing interlock contacts 58a, conductor 216, contacts 217 of selector switch 46, conductor 218, the operating coil of relay 215, and by conductor 218 to the other supply line 205. This relay has been illustrated after its operation to close its contacts 220, 221 and 222.

Upon closure of the contacts 192 of motor-blocking interlock 55, an energizing circuit is completed for the operating coil 223 of stepping switch I. By further reference to said Forsberg et al. Patent No. 1,472,465, it will be seen that the switch I is advanced upon de-energization of operating coil 223. Energization thereof operates an armature to apply tension to a spring and to render a stepping pawl effective to advance the switch. This energizing circuit for operating coil 223 may be traced from the supply line 195, contacts 196 and 197, conductor 199, conductor 224, contacts 192, conductors 225, 226 and 227, contacts 228 of a single-pole double-throw switch operated with the "in" and "out" switch numbered "1" in Fig. 1, conductors 229 and 239, bridging member 231 of a second contact deck of multiple-point switch I, conductor 232, contact 220 of the synchronizing relay 215, conductor 233, operating coil 223, and by conductor 234 to the other supply line 205.

As soon as the recorder has printed the bank-identifying symbol "1," the motor 53, Figs. 3, 4 and 6, operates the cam 190, Fig. 6, to its "first" position to open the circuit through the contacts 192 for the de-energization of the operating coil 223 of multiple-point switch I. The operating coil 223 thereupon releases the armature and the stepping pawl is actuated by a spring to move the switch I to its second position. The bridging members 153 and 156 thereof then serve to connect the thermocouple 35a to the proper circuits as has already been explained. As the switch operates through this first step, it opens and closes a circuit through the contacts 235 for reasons which will be later explained. As a matter of fact, contacts 235 open and close for each advance of switch I to a new position. The stepping switch I also has additional decks which include the simultaneously operated bridging members 236 and 237.

In the first position of the selector switch I, the bridging member 236 completes a circuit for the first point-identifying signal light 1, which circuit may be traced from the supply line 195 through conductor 238, contacts 239 of the single-pole double-throw switch 1c, the bridging member 236, the numeral illuminating lamp 1, and by conductor 240 to the other supply line 205. It will be apparent from an inspection of this circuit that as the bridging member 236 is moved to its second position the second numeral-illuminating lamp 2 will be energized and the first lamp extinguished. For successive positions of the bridging member 236, the signal lamps 1—21 are successively energized in manner already explained in connection with Fig. 1. In the last position of the selector switch I, the bridging member 236 transfers the circuit through contacts 241 of a single-pole double-throw switch 2c to the bridging member 242 of the stepping switch II.

The bridging member 237 in the first position of selector switch I serves to energize the first of the bank-identifying lights, the lamp 1, through a circuit which may be traced from the supply line 195 by conductor 243, contacts 244 of a single-pole double-throw switch 1d also operated with the "in" and "out" switch "1" of Fig. 1, the bridging member 237, bank-indicating lamp 1, and by conductor 245 to the other supply line 205. For the second and subsequent positions of the multiple-point switch I, the signal lamp 1 continues to be energized through this same circuit.

In the past position of the switch I the energizing circuit is transferred by way of conductor 246, through the contacts 247 of a single-pole double-throw switch 2d to the bridging member 248 of multiple-point switch II.

As the multiple-point selector switch I is moved to its second position the bridging member 231 in moving from its first to its second position removes relay contact 220 from the energizing circuit of the selector switch operating coil 223. The synchronizing contacts 58a also move to their open position since the cam 58 is so designed as to close the circuit through contacts 58a only during the time each selector switch is in its first position. The opening of contacts 58a de-energizes the operating coil of the synchronizing relay 215, which thereupon operates to open contacts 220, 221 and 222.

As soon as the selector switch I is in its second position, the temperature of the thermocouple 35a is measured. After the operation of the print-wheel to record the temperature of thermocouple 35a, the cam 190 again functions to close the contacts 192. (While contacts 111 and 115 have opened and contacts 191 have closed, they are ineffective to modify the operations since they are bridged or shunted by the motor-blocking interlock 194 during automatic operation.)

When the contacts 192 are again closed, the operating coil 223 of the switch I is again energized through a circuit which may be traced from the supply line 195 by contacts 196 and 197, conductors 199 and 224, contacts 192, conductors 225, 226 and 227, contacts 228, conductors 229 and 239, bridging member 231 (now in its second position), conductor 233, operating coil 223, and by conductor 234 to the other supply line 205.

It will be seen that as long as contacts 192 complete this circuit the coil 223 will remain energized. It is again emphasized that each of the multiple-point stepping switches is so designed that the stepping or advance of the bridging members from one position to the next does not occur until the de-energization of the operating coil. In other words, as fully explained in said Forsberg et al. Patent No. 1,472,465, the energization of the operating coil serves to apply a strong spring bias, which through a stepping pawl, upon de-energization of the operating coil, produces movement of the brushes or bridging members to their next positions. Hence, as soon as the cam 190 against moves the crest thereof to open the circuit through the contacts 192, the stepping switch I then moves or advances each of its bridging members 156, 153, 231, 236 and 237 to their next, or third, position. This operation continues until these bridging members simultaneously occupy their last, or twenty-second, position.

In such last position it will be recalled that the bridging members 153 and 156 effectively transfer the measuring circuit to the first thermocouple 36a of switch II. In other words, the last position of multiple-point switch I corresponds with the first position of multiple-point switch II. Hence, when the multiple-point switch I is operated to its last position, the synchronizing contacts 58a are again closed by the cam 58. The closing of the contacts 58a again completes the energizing circuit, which has already been traced, for the synchronizing relay 215, which thereupon closes its contacts including the contacts 221.

Consequently, after the measurement of the temperature of the thermocouple 36a, the operating coil 252 of the multiple-point switch II is energized preparatory to movement of the bridging members 165, 163, 257, 242 and 248 from their first to their second positions. The bridging member 231 of switch I in its last position serves partly to transfer the energizing circuit from the operating coil 223 to the operating coil 252. This circuit may be traced from the supply line 195, contacts 196 and 197, conductors 199 and 224, contacts 192 (which, of course, have closed after measurement of the temperature of thermocouple 36a), conductors 225, 226 and 227, contacts 228, conductors 229 and 239, bridging member 231 (in its last position), conductors 253 and 254, contacts 255, conductor 256, bridging member 257, contacts 221 of synchronizing relay 215, conductors 258—260, operating coil 252 of switch II, and by conductor 261 to the other supply line 205.

As soon as the cam 190 is rotated so that the contacts 192 open the foregoing circuit, the multiple-point switch II moves to its second position. At substantially the same time, the synchronizing contacts 58a again open and the synchronizing relay 215 is again de-energized. The stepping switch II is then operated under the control of contacts 192 in the same manner as described for the multiple-point switch I. As before, bridging member 257 in its second position removes relay contacts 221 from said energizing circuit.

Each time the circuit is completed through the contacts 192, the coil 252 is energized to advance the switch to its next position. When it reaches its last position, which electrically corresponds with the first position of the next bank, the circuit is transferred to the next, or, as shown, the last operating coil 262. The intermediate banks have been omitted in Fig. 6 in order to simplify the illustration of the control circuits. However, the last multiple-point switch VII has been illustrated and it will be seen that the circuit is transferred to the operating coil 262 by movement of the bridging members to the last position. As indicated in Fig. 6, this, of course, corresponds with the first position for switch VII. Accordingly, the synchronizing interlock contact 58*a* will again be closed and the synchronizing relay 215 will be closed. Hence, the energizing circuit for the operating coil 262 will be the same as previously traced for the coil 252 down to the conductor 254, contacts 255 and the conductor 256. In said last position of switch II, the bridging member 257 transfers this energizing circuit from conductor 256 to conductor 264, and it may be further traced by conductor 265, contacts 266 of a single-pole double-throw switch 7*b* operated with the seventh or No. 7 "in" and "out" switch of Fig. 1, conductor 267, bridging member 268 of switch VII, conductor 269, contacts 222 of synchronizing relay 215, conductor 270, relay coil 262, and by conductor 271 to the other supply line 205. Upon opening of the contacts 192, the coil 262 will be de-energized and multiple-point switch VII will move to its second position.

During these various operations the bank-identifying lights 1—7 of Fig. 1 are successively energized. In Fig. 6, the transfer is direct from bank-identifying light 2 to bank-identifying light 7, this transfer being shown by the arrival of the bridging member 248 in the last position of the switch II. The transfer of the circuit is by way of conductor 272, to the contacts 273 of a single-pole double-throw switch 7*d* operable by the "in" and "out" switch No. 7 of Fig. 1, the bridging member 274 of switch VII, bank-indicating light 7 and by conductor 245 to the other supply line 205.

Similarly when the bridging member 242 of the point-identifying bank of selector switch II reaches the last position, the circuit is transferred by way of conductor 276, contacts 277 of a single-pole double-throw switch 7*c* also operated with the "in" and "out" switch No. 7 of Fig. 1, and to bridging member 278. In the first position of switch VII it will be observed that signal light 1 will be energized and in the second position signal light 2 will be energized, and in further positions of switch VII the additional signal lights will be energized in succession during the twenty-first positions thereof.

Although two relays, 167 and 172, have been illustrated in Fig. 5 in order to change the compensating circuits for the thermocouples of differing range, only one of these relays, the relay 172, has been shown in Fig. 6. This relay may be conveniently energized by connecting the operating coil thereof in parallel with the bank-indicating lamp No. 7. This connection is completed by way of conductor 280. In other words, as soon as the preceding switch (in Fig. 6 shown to be switch II) reaches its last position the signal light 7 is energized and the relay 172 is closed to connect, by conductor 172*a*, the bridging member 173 of switch VII and its associated thermocouples to the proper point in the bank-identification and reference-junction circuits indicated at 67. Obviously, other relays, such as the relay 167 of Fig. 5, may be provided and their energizing circuits may be completed in similar manner; for example, by additional relay circuits in parallel with bank-identifying lights 1 and 2.

In the last position of the last multiple-point stepping switch VII, the bridging member 278 of the point-identifying section completes an energizing circuit for the operating coil of a relay 282 which thereupon operates to close its contacts 283, 284, 285 and 286. This energizing circuit may be traced from the supply line 195 by conductor 238, contacts 239, bridging member 236, conductor 288, contacts 241, bridging member 242, conductor 276, contacts 277, bridging member 278, conductors 289 and 290, contacts 291 of relay 198, conductor 292, contacts 235 of switch I, contacts 293 of switch II, contacts 294 of switch VII, conductor 295, contacts 298 of relay 198, operating coil of relay 282, and by conductor 299 to the other supply line 205.

As soon as the contacts 192 again close, energizing circuits will be simultaneously completed for the operating coils 223, 252 and 262 of the respective stepping switches I, II and VII. These energizing circuits have previously been traced and they are all the same down to and including the conductor 227, the contacts 228 of switch 1*b*, and conductor 229. It will be observed this conductor 229 is connected to one side of the contacts 283 of relay 282. When closed, this energizing circuit then is by way of conductor 233, the operating coil 223, and by conductor 234 to the other supply line 205. From the conductor 229, the energizing circuit for the coil 252 may be traced through the bridging member 231, conductor 253, contacts 255, conductors 256 and 301, contacts 284 of relay 282, conductors 259 and 260, operating coil of relay 252, and by conductor 261 to the other supply line 205. Similarly, the energizing circuit for the coil 262 is simultaneously completed and may be further traced from conductor 256 by bridging member 257, conductors 264 and 265, contacts 266, conductors 267 and 303, contacts 285 of relay 282, conductor 270, operating coil 262, and by conductor 271 to the other supply line 205.

As a result of the closing of these energizing circuits, each of the operating coils 223, 252 and 262 operate each selector switch preparatory to movement from their last to their first position. As the contacts 192 open, the switches move to their first positions.

It will also be observed that the bridging member 268, of switch VII, in its last position also completes a circuit which extends from conductor 267 through bridging member 268, conductor 304, contacts 286 of relay 282, and by conductor 290 to the contacts 305 of relay 198. If the relay 198 were in the de-energized position it would be observed that this circuit would then be completed through the contacts 305 to energize the operating coil 198, this circuit being completed to the other side of the line by the conductor 213. Upon operation of the relay 198 to its closed position the holding circuit through the contacts 212, which has already been traced, would be established to retain this relay in its energized position.

As already explained, in connection with Fig. 1, the "in" and "out" switches 1—7 serve to include or exclude a particular bank of thermocouples. The first "in" and "out" switch consists of four sections, identified in Fig. 6 by the reference characters 1*a*, 1*b*, 1*c*, and 1*d*. When this switch is operated from the "in" position to its "out" position, the section or deck 1a transfers the connections from the bank-identification and measuring circuits to switch II. The section or deck 1b transfers the coil-operating circuit from coil 223 to the operating coil 252 of switch II. The section or deck 1c transfers the energizing circuit for the point-indicating lamps from the control of switch I to switch II. Similarly, the deck or section 1d transfers the energizing circuit from the bank-identifying lamp-section of switch I to the bank-identifying lamp-section of switch II. In like manner, the "in" and "out" switches 2a—2d and 7a—7d may be operated similarly to exclude any one of the several banks of thermocouples. Thus, automatic operation may proceed with only banks 1 and 7 included in the cycle of automatic operation, or bank 1 may be excluded and the automatic cycle continued with banks 2 and 7 effective; or any combination of the seven banks may be included in the automatic cycle.

When it is desired immediately to know the temperatures of certain of the thermocouples, without waiting for the completion of a complete cycle, the selector switch 46 may be moved to its "M" or "Manual" position. With the switch 46 in the manual position, the circuit traced through the contacts 203 is interrupted, thus de-energizing the operating coil 193 of the motor-blocking contacts or interlock, which thereupon operates to open the bypass circuits around the contacts 111, 115 and 191. Similarly, the energizing circuit traced through the contact 196 is now transferred to contact 310. This circuit includes conductor 311 and the manually operable push-button 47.

The energizing circuit traced through the contact 217 is now completed through contact 312. It will be apparent from inspection that the operating coil 215 of the synchronizing relay is continuously energized as long as the switch 46 is in the manual position. The contact member cooperating with contacts 208 and 313 is so constructed that before the circuit through the contact 208 is interrupted, a circuit is completed through contact 313. Hence, relay coil 198 continues to be energized and will remain energized as long as the switch 46 remains in the manual position. The circuit through the contact 210 is also interrupted with the movement of the switch 46 to the manual position.

If now the push-button 47 is momentarily closed, an energizing circuit for the operating coil 223 is completed. This circuit may be traced from the supply line 195 by contact 310, conductor 311, push-button 47, conductors 226 and 227, contacts 228, conductors 229 and 239, bridging member 231, conductor 232, contacts 220 of relay 215, conductor 233, operating coil 223, and by conductor 234 to the other supply line 205. Hence, as soon as the push-button 47 is released to open this circuit, the multiple-point switch I is operated from the first position to its second position. If the push-button 47 is rapidly operated, the operating coil 223 rapidly moves the multiple-point switch I through a plurality of its positions. At any given instant the bank-identifying lights clearly indicate the particular point occupied by multiple-point switch I. Thus, as soon as a desired thermocouple is connected to the measuring circuit, the system will then function automatically to indicate the temperature thereof.

It will be understood that continued operation of the push-button switch 47 will operate switch I to its last position. This transfers the energizing circuit to the next operating coil 252. Hence, switch II may then be stepped through all of its positions. The switch-operating circuit is automatically transferred to the next operating coil and so on.

Inasmuch as the push-button 47 may be operated at any time, such for example as during the time the printwheel is registering a numeral or symbol on the chart, provision is made for holding the motor 63 at standstill during each printing operation. Thus, in accordance with the invention, all danger of movement of the printwheel while in contact with the chart is eliminated. There is no possibility of the printwheel tearing the chart because of such movement. The foregoing is accomplished by circuits under the control of the motor-blocking interlock 55 which include the contacts 111 and 115. It will again be remembered that the operating cam 190 is driven by the constant speed motor 53, Fig. 3, which not only drives the chart 34 but which also actuates the mechanism which produces a printing operation of the printwheel 33. Hence, the cam 190 is timed so that just prior to the printing operation it functions to open the circuits through the contacts 111 and 115. The opening of the contacts 115 de-energizes field winding 63a. The opening of the contacts 111 removes the shunt or bypass circuit around the rectifier 110. In consequence, the rectifier 110 is effectively connected in series with the alternating current source of supply 108 and 109 and the motor field winding 63b. The resulting direct current which flows through the motor field winding 63b exerts a braking action upon the motor 63. It is not only quickly braked to standstill but it is held at rest as long as the braking circuit is complete. Hence, the printing, under manual operation, always takes place with the motor 63 at standstill and there is avoided any possibility of lateral movement of the printwheel 33 across the chart. As soon as the printing operation has been completed, the cam 190 moves to a position to close the contacts 111, 115 and 191.

Whenever it is desired to return to fully automatic operation, it is only necesary to operate the selector switch 46 to the "A" or "Automatic" position. Of course, when this is done, the push-button switch 47 may have operated the multiple-point selector switches to any one of their many positions. The printwheel may be out of step with respect to the selector switches. However, the system soon synchronizes the operation with that of the printwheel.

It will now be assumed that the push-button 47 has produced operation of multiple-point selector switch II for the measurement of the temperature of thermocouple 36b and that the switch 46 is then operated to its automatic position. The completion of the circuit through the contact 203 does not immediately energize the operating coil 193 of the motor-blocking interlock 194. As already mentioned, the energizing circuit for the operating coil of the relay 198 is maintained during the transfer of this circuit from the contact 313 to the contact 208. The operating coil of the synchronizing relay 215, however, is de-energized by return of switch 46 to the "Automatic" position, and this relay moves to its open position. The system then functions to measure the temperature of the thermocouple 36b. Just prior to the printing operation the motor 63 is braked to standstill. As the printing operation is completed, the cam 190 closes the contacts 191 to complete the energizing circuit for the coil 193 which thereupon operates to close the bypass contacts which complete its own energizing or holding circuit. Due to the delayed energization of the coil 193, the motor 63 will be blocked and held at standstill during any printing operation which might occur immediately after the movement of the switch 46 from the manual to the automatic position. After the first printing operation, however, this much of the system is again in synchronism. Timed operation has been restored. Therefore, the operating coil 193 may be safely energized to complete the bypass circuits and render the motor-blocking devices ineffective for continued automatic operation.

In manner already described, the multiple-point switch II is thereafter operated until its bridging members 165 and 163 occupy positions corresponding with the last position of this switch. It will be recalled that in the last position of each switch, which corresponds with the first position of the following multi-point switch, it is necessary for the synchronizing contacts 58$a$ to be closed before the operating coil of the next multiple-point switch may be energized. Hence, when switch II is in its last position, the cam 58 closes the contact 58$a$ to complete the energizing circuit for the synchronizing relay 215. The cam 58, it will be remembered, is also operated by the constant speed motor 53, Fig. 3, and is so synchronized with respect to the printwheel 33 that the contacts 58$a$ are closed only during the time the printwheel 33 occupies a position for the printing of the numeral or symbol "1." on the chart 34. By reason of these provisions, the printwheel is thereby synchronized with the multiple-point switches. For example, if the printwheel were to print symbol "3." at the time multiple-point switch II reaches its last position, the temperature of the thermocouple of the next switch bank, such for example as the thermocouple 41$a$, of multiple-point switch VII, would be repeatedly measured and its temperature would be recorded on the chart 34 until the printwheel had advanced to its No. 1 position and had printed the numeral "1." on the chart. Thereafter the printwheel would be synchronized with the subsequent operations of multiple-point switch VII. As already described, in the seventh position of switch VII the identifying symbol "7." would be printed in the seventh space, Fig. 2-A, properly to identify or to show on the chart that switch bank VII is then connected to the recorder.

The foregoing automatic synchronization of the system necesarily consumes a certain amount of time, even though it is only a few minutes. To avoid loss of time in resynchronization, the selector switch 46 has a third position, designated in Fig. 1 as "Clear," and in Fig. 6 as "FC," indicating its fast-clearing position. When selector switch 46 is moved to its fast-clearing position, the contact member 315 is moved to open the circuit through the contact 210. This de-energizes the operating coil of the relay 198 which, of course, moves to its open position. The selector switch 46 is only momentarily held in its fast-clear position. In fact, it is spring-biased from the fast-clearing position to the automatic position so that if moved to the former position and released it is automatically returned to the automatic position. This, of course, returns the bridging member 315 to engage contact 210 to complete an energizing circuit for the operating coils of the multiple-point switches. This circuit may be traced from the supply line 195 by conductor 207, contact 208, conductor 209, bridging member 315, contact 210, conductor 211, contact 316 of relay 198, conductor 292, contacts 235, 293 and 294 of switches I, II and VII, conductor 295, and by contact 317 of relay 198 to conductor 227.

It will be recalled that all energizing circuits for the respective operating coils of switches I—VII are completed by way of conductor 227. Hence, regardless of the positions of any of the multiple-point switches, the first in the series which has not been moved to its final position is immediately energized for operation thereto. For example, it will be assumed switch II is in its third position when the selector switch 46 is moved to its fast-clear position and returned to the automatic position. In such case, the energizing circuit already traced to conductor 227 continues by way of contact 228, conductors 229 and 239, bridging member 231, conductors 253 and 254, contact 255, conductor 256, bridging member 257, conductors 259 and 260, operating coil 252 of switch II, and by conductor 261 to the other supply line 205. A capacitor 306 is connected in shunt with switch contacts 235, 293 and 294 to reduce arcing during rapid operation thereof.

Upon energization of coil 252 the armature not only moves the spring-biased ratchet to a switch-advancing position, but it also operates to open the circuit through contact 293 which, of course, interrupts the energizing circuit of the coil 252. Upon de-energization thereof, the switch II advances to its next position and the energizing circuit through contact 293 is again closed. This step-by-step operation rapidly continues until switch II is moved to its final position. In like manner, the additional energizing coils, such for example as the coil 262 for the switch VII, are energized until all occupy their last position. In the last position of switch VII, an energizing circuit is completed for the relay 198 which may be traced from the supply line 195, by conductor 238, contact 239, bridging member 236, conductor 288, contact 241, bridging member 242, conductor 276, contact 277, bridging member 278, conductors 289 and 290, contact 305 of relay 198, operating coil of relay 198, and by conductor 213 to the other supply line 205. The contacts 305 and 212 of relay 198 are so designed that the circuit just traced through the contact 305 is not interrupted until the completion of a holding circuit through the contact 212. This holding circuit has already been traced. Upon closure of the relay 198, an energizing circuit for the relay 282 is completed. This energizing circuit is the same as for the coil of relay 198 up to the point where the conductor 290 is connected to the contacts 305 and 291. This circuit extends through contact 291, conductor 292, through the switches 235, 293 and 294, conductor 295, contact 298 of relay 198, operating coil of the relay 282 and by conductor 299 to the other supply line 205.

Upon closure of the contacts of relay 282, the energizing coils 223, 252 and 262 are energized to operate each of the multiple-point stepping switches I, II and VII from their last to their first positions. The operation of each switch interrupts the circuits through the aforesaid contacts 235, 293 and 294 and upon de-energization of each coil, the respective switches I, II and VII return to their No. 1 positions. The movement of the bridging member 278 to its first position, of course, interrupts the foregoing energized circuit which was traced through this bridging member and prevents further energization of the relay 282 until the bridging member 278 again occupies its last switching position. Relay 198 is de-energized only during the fast-clearing operations.

It will be recalled that the operating coil 223 of switch I cannot be energized to move the switch from its No. 1 position until after the closure of the synchronizing contacts 58*a*. Hence, if the printwheel occupies a position other than its corresponding No. 1 position, operations are suspended until the driving motor 53 has moved the printwheel to its No. 1 position. After the printing of the bank-identifying symbol "1." in the first space of the recorder chart, Fig. 2–A, the energizing circuit for the operating coil 223 is completed through the contacts 192 of the cam-operated switch 55 and through the synchronizing contacts 58*a*. The coil 223 thereupon operates the stepping switch I to its second position. In this manner, the system as a whole continues automatic operation with all parts synchronized.

The entire fast-clearing operation occurs within a time not exceeding thirty-eight seconds.

Figures 7, 8, 9:
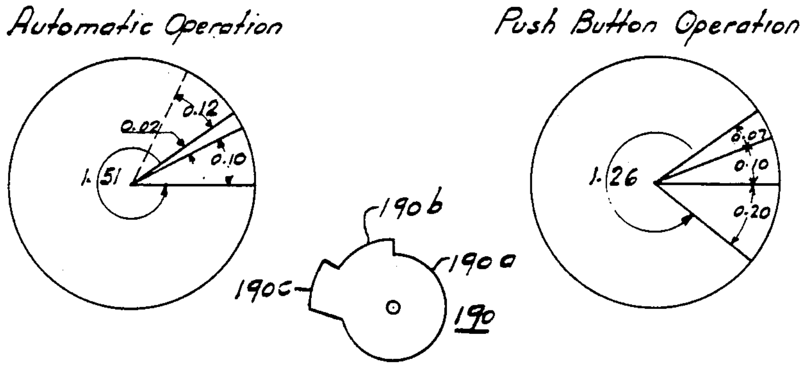
Fig. 7 is an enlarged view of the cam 190, of Figs. 4 and 6, which operates the stepping and synchronizing interlock.
Figs. 8 and 9 are timing diagrams which show the relative times required for different operations.

The timed operations of the system have been graphically illustrated in Figs. 8 and 9. For automatic operation, it will be assumed the printwheel has been moved against the chart. It remains in contact therewith for one-tenth of a second as indicated by the arrow in Fig. 8 marked "0.10." Immediately prior to this tenth of a second the high level or peak 190*c* on cam 190, Figs. 6 and 7, closes the advancing contacts 192, Fig. 6. At the end of the printing operation the cam 190 has moved to the intermediate level 190*b* and these contacts open and the multi-point stepping switch advances to its next position in 0.02 of a second. The measuring system is then effective to begin measurement of the magnitude of the condition or temperature of the next thermocouple. A total time of 1.51 seconds is allowed, which is more than is needed for accurate measurement of conditions whose magnitudes may be recorded in succession at opposite ends of the calibrated record chart. While the measurement of the next condition is taking place, the printwheel is advanced to its next position, the time required being 0.12 of a second.

During push-button operation, it will be recalled the slidewire driving motor 63 which moves the printwheel across the chart is blocked or held at standstill just prior to, and during each printing operation. To insure its coming to rest from its maximum speed, blocking is initiated 0.20 of a second prior to contact of the printwheel with the chart. The motor 63 remains blocked during the 0.10 second required for printing and for 0.07 of a second thereafter. Hence, there is left 1.26 seconds for the measuring or balancing operations.

Now that the system as a whole has been described, it will be understood many modifications of the invention may be made. Any number of multipoint switches may be used, each with any desired number of circuit-controlling contacts.

Where the desired number of condition-responsive devices or thermocouples is within the reasonable design limitations of a multiple-point selector switch, the system as a whole may be simplified. In accordance with a further modification of the invention, there is diagrammatically illustrated in Fig. 10 a fractional part of a multiple-point switch 350 having fifty circuit-controlling positions. One of several circuit-controlling decks of the switch includes a slider 351 operable through the fifty positions of the switch, only twenty of which are illustrated.

Through another deck of the selector switch (not shown) a relatively high voltage is applied to the measuring circuit which produces rapid movement of the printwheel to the upper limit of the scale or record chart, when the selector switch is in its first or "0" position. In that position, the printwheel registers the numeral or symbol "0." in a distinctive position on the chart, which position is as near to the margin thereof as the printwheel 33*a* may be driven. The operating coil 352 is energized under the control of a switch 353 which is periodically closed by rotation of a cam 354, driven by the constant speed motor 53 which also drives the recorder chart 34*a*. The motor 53 also drives the brush or bridging member 355 of a synchronizing switch 356. The synchronizing switch 356 has ten positions corresponding with the ten symbols or numerals on the printwheel 33*a*. Preferably the printwheel is provided with the ten numerals 0—9. With the selector switch 350 in its first position, upon closure of the contacts 353 by the cam 354, an energizing circuit for the operating coil 352 is completed. This circuit may be traced from the positive source of supply 357 by the manually operable switch 358, operating coil 352, bridging member 351, conductor 359, bridging member 355 of the synchronizing switch 356, conductor 360, and by contacts 353 to the negative supply line 361. Upon opening of the contacts 353, the selector switch is advanced from its first or "0" position to its second or No. 1 position.

In this position a thermocouple or other condition-responsive device is connected to the measuring circuit by contacts of two separate decks in the same manner as already described in the modification of Figs. 1–9. After the measuring operations have been completed the printwheel 33*a* prints the symbol "1." on the record chart 34*a* and the cam 354 operates contacts 353 to advance stepping switch 350 to its third position. In the operation of cam 354, contacts 353 are closed just before printwheel 33*a* touches record chart 34*a* and contacts 353 open just after printwheel 33*a* leaves record chart 34*a*. Thus, the selector switch 350 advances immediately after the printwheel 33*a* leaves the record chart 34*a*.

By providing the synchronizing switch 356, it will be observed that the printwheel 33*a* and the multiple-point selector switch 350 must always remain in synchronism. If through mechanical failure they should get out of synchronism, the stepping switch 350 will not advance. It will remain stationary until the synchronizing switch 356 has again moved its bridging member 355 in a position to synchronize with the slider 351. When these two bridging members 351 and 355 occupy corresponding positions, proper operation of the stepping switch is resumed by completion of the energizing circuit for the operating coil 352.

In accordance with this modification of the invention, the "0." position of the selector switch is the first identifying point and every eleventh position thereafter represents identifying points. In other words, when the bridging member 351 reaches its twelfth position, marked "11," other decks (not shown) of switch 350 apply the relatively high potential difference to the measuring circuit to move the printwheel 33*a* to its upper limit with respect to the chart 34a. In that upper-limit position, the symbol or numeral "1." is printed on the chart to identify the next bank or group of condition-responsive devices which correspond with numbered positions 10, 12—19 of selector switch 350.

In the twenty-third position of the selector switch 350 the printwheel 33a prints the numeral "2." at the upper limit of the chart 34a and for the successive banks or groups of condition-responsive means, the numerals "3." and "4." are printed on the chart.

Further in accordance with the invention, the printwheel 33a may be provided with inking pads of distinctive colors to correspond with condition-responsive means of differing range. The manner in which such inking pads are associated with the printwheel is fully disclosed in Ross et al. Patent No. 2,113,069. Hence, each of the five groups of thermocouples may be of a differing range and each may produce operation of the printwheel 33a to record in a distinctive color the magnitudes of the conditions thereof. However, three of the groups may be of the same range. The characteristic color thereof may be blue. The other two banks may be of differing range. The distinctive colors thereof may be red and yellow respectively.

In one embodiment of the invention, seven condition-responsive means of each group were for the low range and one each for the middle and high ranges. In this embodiment, numerals "0." to "7." were printed in blue for the low range, numeral "8." in red for the intermediate range and numeral "9." in yellow for the high range.

In this way, five groups of nine condition-responsive devices may be under the control of the single stepping switch 350. If desired, each group may be of a different range or may comprise condition-responsive means of differing character. By providing the single stepping switch 350, one deck thereof may be utilized to complete the proper connections to the compensating network for the particular range of the thermocouples. In view of the thorough discussion of the principles involved in the modification of Figs. 1–9 thereof, it is believed these circuits will now be relatively obvious and, therefore, they have not been illustrated again.

If at any time it is desired continuously to read or to record the magnitude of any particular condition, it is only necessary to observe when the selector switch 350 has connected the system to the corresponding condition-responsive element. The manually operable switch 358 is then moved to open the circuit of the operating coil 352. The system will then continue to indicate and record the temperature of that particular condition-responsive element.

Figure 10:
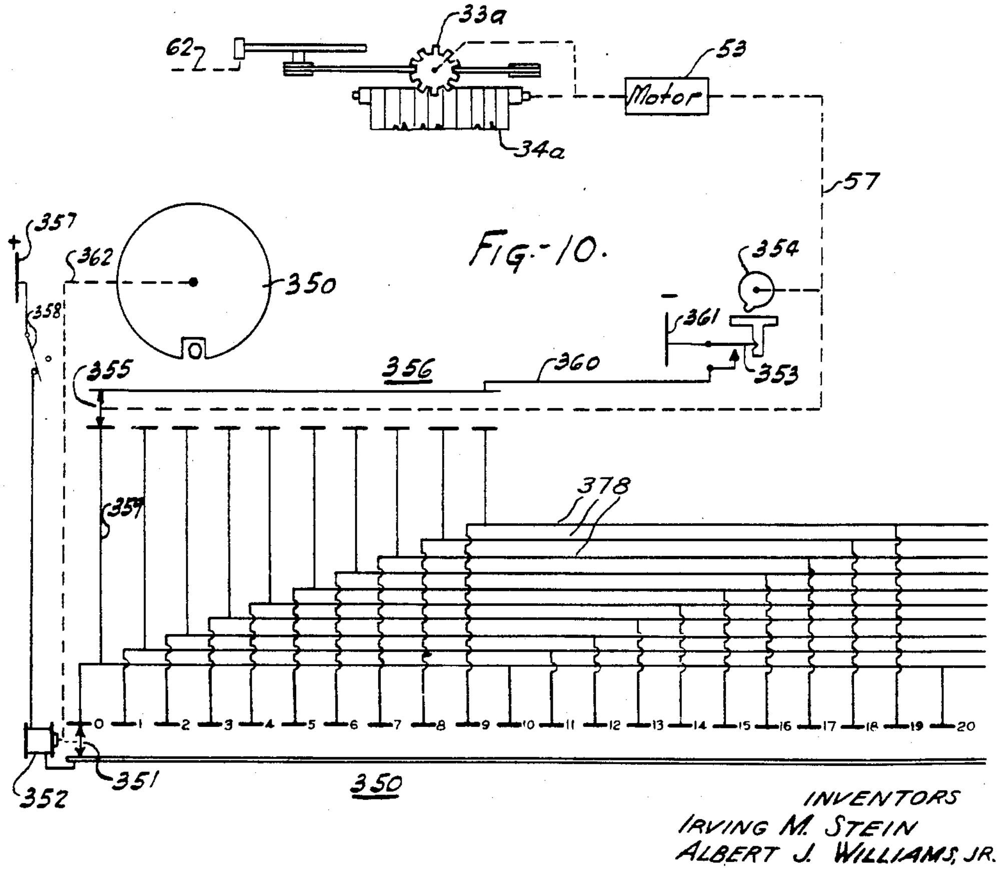
Fig. 10 is a wiring diagram of the essential elements of a modified form of the invention.

The position of the selector switch 350 may be indicated by signal lamps as described in connection with the modifications of Figs. 1–9. Additionally, the selector switch 350 may also be provided with a disk on which numerals are stamped or impressed, each corresponding with each of the fifty positions thereof. As shown in Fig. 10, the numeral "0." appears through a window in a mask 350a which shields this disk. The disk itself is rotated with the brushes or bridging members of switch 350, as indicated by the broken line 362. Preferably, it is connected to, or mounted on, the shaft of switch 350.

Figure 11:
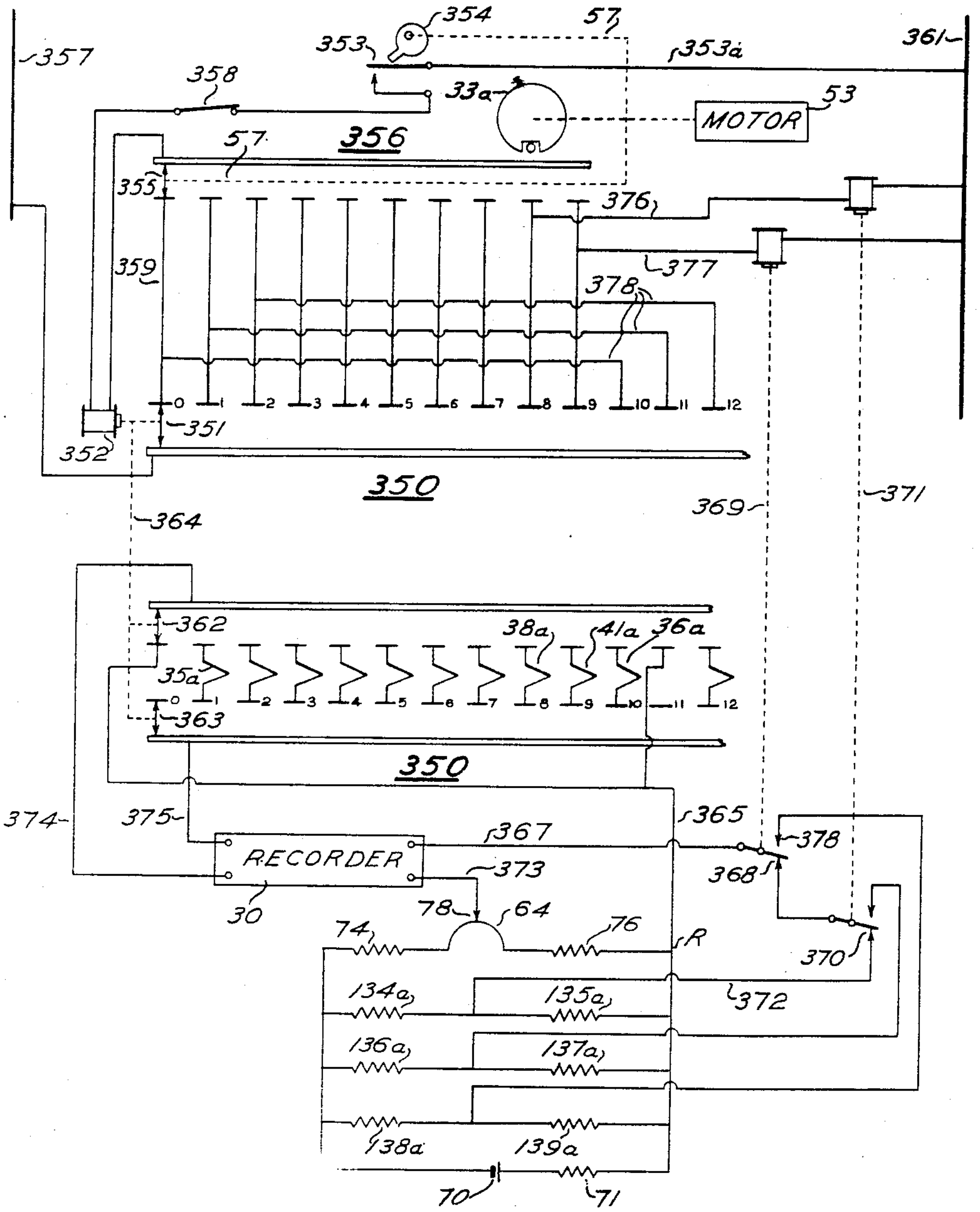
Fig. 11 is a wiring diagram of the essential elements of a further modified form of the invention.

As shown in Fig. 11, where thermocouples of differing ranges are to be used, the range-changing features of the modification of Figs. 1–9 may be combined with the simplified system of Fig. 10. More particularly, Fig. 11 illustrates a preferred embodiment of the invention generally similar to Fig. 10, but differing therefrom in several important respects. The parts having the same general functions as those heretofore described have been marked with the corresponding reference numerals. The "Recorder" 30 of Fig. 11 is indicated by a rectangle which represents the detector, certain associated circuits and devices whose illustration is not necessary to an understanding of this modification of the invention. As before, the motor 53 drives the cam 354 to operate the contacts 353 of the advancing switch, and to drive the bridging member 355 of the synchronizing switch 356. The multiple-point stepping switch 350 has been illustrated with the deck of the contacts which includes the bridging member 351, as well as the additional decks of contacts with their associated bridging members 362 and 363. These bridging members are simultaneously advanced upon de-energization of the operating coil 352. The bridging members 362 and 363 serve to complete the input circuit to the recorder 30, having associated therewith a slidewire 64, which is adjustable relative to its contact 78. The slidewire 64 is included in the measuring system which includes resistors 74 and 76 in one branch thereof. The measuring circuit also includes compensating resistors 134a, 135a, 136a, 137a, 138a, and 139a, each pair thereof being in parallel with the branch of the measuring circuit which includes resistor 74, the slidewire 64, and the resistor 76.

It will be observed that the input circuit of the recorder 30 also includes a connection to the point R of the network, this circuit being by way of conductor 365, bridging member 362, and conductor 366 to the recorder. The measuring and compensating network of the recorder also includes a connection by way of conductor 367, contacts 368 of a range-changing relay 369, contacts 370 of a range-changing relay 371, and by conductor 372 to a point common to resistors 134a and 135a. The recorder input circuit also includes a connection by conductor 373 to the contact 78 of slidewire 64. With these connections the network develops at the point R a relatively high potential with respect to contact 78 which causes operation of the indicator and printwheel to the high limit of their movement with respect to their associated scale and chart. As already described in connection with Fig. 10, the printwheel of the recorder 30 registers at its upper limit the identifying symbol "0." As before, the cam 354 closes the contacts 353 just before the printwheel engages the record chart and opens these contacts just after the printwheel leaves the record chart. The closing of the contacts 353 completes an energizing circuit for the operating coil 352 which may be traced from the supply line 357 by bridging member 351 (in its 0 position), the conductor 359, bridging member 355 of synchronizing switch 356, the operating coil 352, manually operable switch 358, advancing contacts 353, and by the conductor 353a to the other supply line 361.

When the contacts 353 open, the bridging members 351, 362 and 363 move to switch position 1, corresponding with the printing position of numeral 1 on the printwheel. For ready identification, the switch positions have been marked from 0 to 12. Actually there are fifty switch positions, that is, from 0 to 49 inclusive. In switch position 1, a thermocouple 35a is connected by bridging members 362 and 363, and by associated conductors 374 and 375, to the recorder 30, and to the measuring network. As will be readily understood from the other modifications of the invention the recorder 30 measures and records the temperature of the thermocouple 35*a*. After this has been done, stepping switch 350 is advanced to its position 2, and so on until it reaches its position 8 for the measurement of the temperature of thermocouple 38*a*. At this time the bridging member 351 completes the circuit by way of conductor 376 to energize the operating coil of the range-changing relay 371. This relay thereupon operates to its energized position to transfer the connection to the measuring and compensating network from the juncture of resistors 134*a* and 135*a* to the juncture of resistors 136*a* and 137*a*. This change in the connections produces automatic compensation for the thermocouple 38*a*, which is suitable for a different range of temperature than the preceding thermocouples. For example, this thermocouple 38*a* may be of the Chromel-Alumel type.

After the measurement of the temperature of thermocouple 38*a* the switch 350 is advanced to its position 9 in which the bridging member 351 completes a circuit by way of conductor 377 to the operating coil of range-changing relay 369. Upon movement from position 8 to switch position 9 the operating coil of relay 371 is de-energized and a circuit is re-established through the contacts 370. However, when the operating coil of relay 369 is energized the recorder is then connected by way of conductor 367, contact 378 of relay 369 in its energized position, to the juncture of resistors 138*a* and 139*a*. These resistors serve to compensate for the thermocouple 41*a*, designed for response to a still differing range of temperatures.

It will be understood that additional relays may be provided for thermocouples of still differing range, with additional compensating resistors provided in the measuring and compensating network.

In position 10 of the switch 350 the first thermocouple 36*a* of the second bank is connected to the measuring network. The corresponding number printed by the printwheel is "0." Switch position 11 is an identifying point. In this position 11 it will be observed the bridging member 362 completes a connection to conductor 365 which again serves to connect the recorder to the point R of the associated network. As before, this produces operation of the printwheel to the upper limit of the chart, at which limit the symbol "1." is printed on the record chart to indicate that a second set of nine thermocouples is being connected in succession to the recorder 30. The first thermocouple thereof, marked 36*a*, may be for a low range of temperature; hence, both relays 369 and 371 will be de-energized. This bank of thermocouples will include thermocouples of differing range corresponding with switch positions 18 and 19. For example, in switch position 18 a conductor (not shown) like one of conductors 378 will connect contact 8 of switch 356 to the contact of upper deck 350 corresponding with switch position 18. Likewise, a conductor 378 (not shown) in switch position 9 interconnects contacts 9 and 19 of these same switches. Hence, the thermocouples for the numerals 8, 18, 28, 38 and 48 will all be of the same range, and the thermocouples corresponding with the numerals 9, 19, 29, 39 and 49 will be of a differing range. In each case, the correct compensation is automatically provided. The invention in its simpler form provides great flexibility of operation and is useful in meeting the requirements of systems of differing types.

Again referring to the modification of Figs. 1–9, it will be remembered that after manual operation, automatic operation is restored either by waiting for a predetermined time interval to elapse or by operation of the switch 46 to its fast-clearing position. Even after operation of the system quickly to return all stepping switches to their initial or No. 1 positions, some time, a half a minute, may still elapse before resumption of the synchronized automatic operation. For example, the printwheel 33 may be in its second position at the time all of the stepping switches are in their first positions. This means that automatic operation will not be resumed until movement of the printwheel through the remainder of its positions and until it is returned to its first position.

Figure 12:
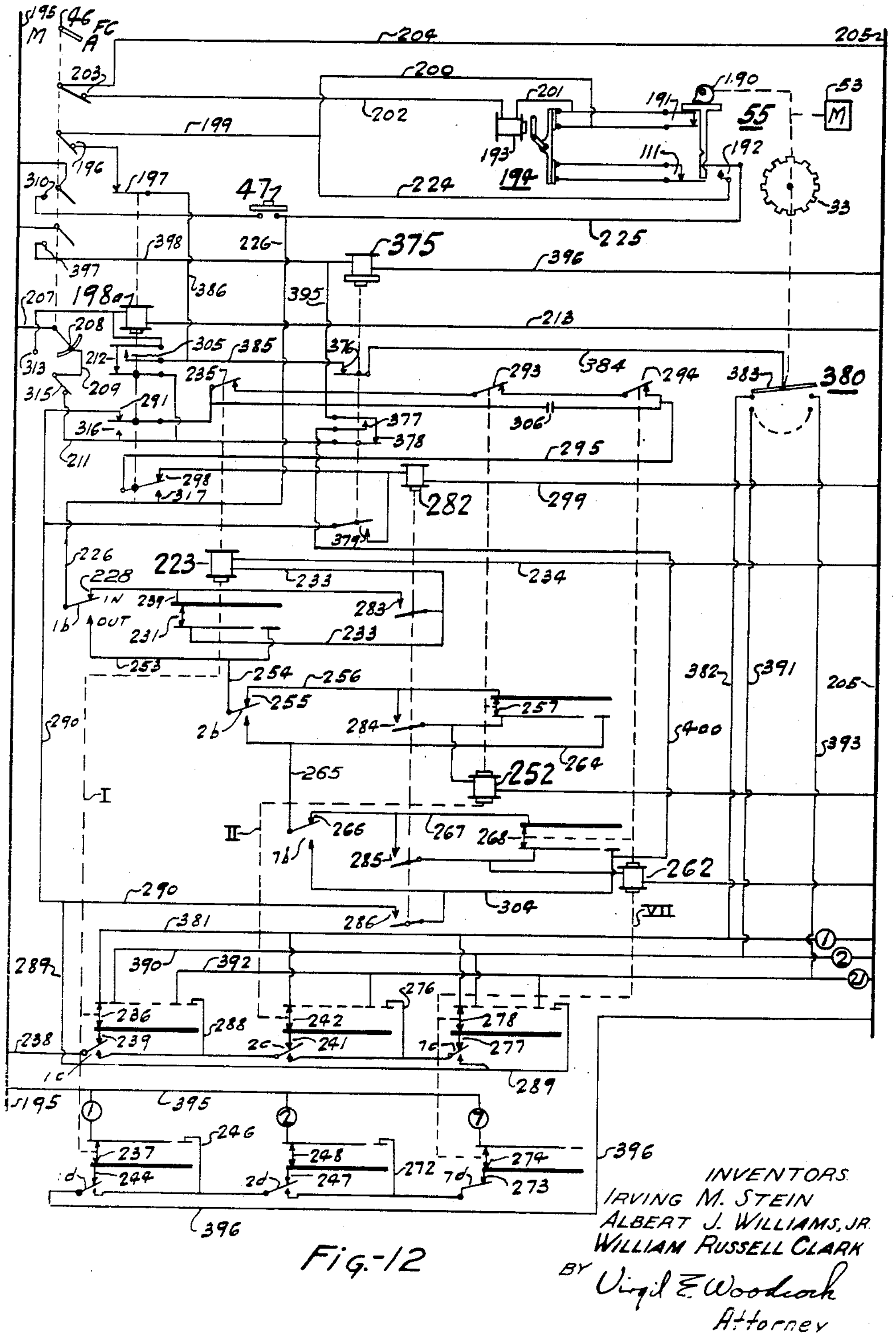
Fig. 12 is a substantially complete wiring diagram of a further modification of the invention.

In accordance with a further modification of the invention, the multiple-point switches are operated at high speed until synchronism is restored with respect to the printwheel. In this way there is avoided the foregoing delay. Referring to Fig. 12, this modification of the invention is diagrammatically illustrated by a wiring diagram which in many respects is similar to that of Fig. 6. Insofar as possible, corresponding reference numerals have been used to indicate corresponding parts and circuits. It will be observed an additional relay 375 has been added, this relay being provided with contacts 376, 377, 378 and 379. The relay 375 is illustrated in its energized position. The printwheel 33 is also illustrated in Fig. 12, the broken lines again illustrating that it is driven by the motor 53 which also drives the cam 190 and a multiple-point synchronizing switch 380. This synchronizing switch 380 may be of generally the same construction as the multiple-point selector switch except that it is operated by the motor 53 through positions equal in number to those of the printwheel 33 and likewise equal in number to the circuit-controlling positions of the respective selector switches I, II and VII. There have been omitted from Fig. 12 the compensating and measuring networks, and only the parts of the cam-operating switch 55 needed for this additional description have been illustrated. The relay 198*a* corresponds with relay 198 of Fig. 6 but because its function differs, the subscript "a" has been added to identify it.

In accordance with the invention, the relay 375 completes control circuits to insure clearing of all stepping switches while relay 198*a* functions to stop a particular switch in synchronism with the position occupied by the printwheel. The relay 375 is a retarded or slow closing relay, that is, upon energization of its operating coil it moves slowly to its energized position. The retarded or slow closing thereof may be insured by provision of a dashpot or by providing magnetically delayed closing thereof.

With the parts in their illustrated positions, the system functions first to produce an identifying symbol on the record chart. As soon as this has been accompished, the cam 190 closes the contacts 192 to complete an energizing circuit for the operating coil of the stepping switch 223. This circuit may be traced from the supply line 195, by conductor 238, contact 239, bridging member 236, conductors 381 and 382, bridging member 383 of switch 380, conductor 384, contacts 376 of relay 375, conductors 385 and 386, contacts 197 of relay 198*a*, contact 196 of selector switch 46, conductors 199 and 224, contacts 192, and by conductor 225 to the conductor 226. From this point on, the circuit is identical with Fig. 6. Continuing the tracing of this circuit, it extends from the conductor 226, through the contact 228, conductor 230, bridging member 231, conductor 233, operating coil of relay 223, and by conductor 234 to the other supply line 205.

Upon opening of the contacts 192, the operating coil of relay 223 is de-energized and the stepping switch I advances to its second position. The temperature of the first thermocouple (omitted in Fig. 12) is then measured and recorded and the contacts 192 close again to complete the energizing circuit for the coil of the stepping switch I. These operations continue until switch I reaches its last position. The energizing circuit is then transferred by the last contact thereof by way of conductor 254 to the operating coil 252 of the second stepping switch II. Following its operation to its last position, the circuit is again transferred by the last contact thereof by way of conductor 265 to the next stepping switch, illustrated as switch VII.

The point-indicating lights, shown as "1," "2" and "21," operate as described in connection with the modification of Figs. 1–9 but these circuits it will be remembered, in accordance with the modification of Fig. 12, perform the additional function of energizing the operating coils of the respective stepping switches. For example, in the second position of stepping switch I, the energizing circuit for the operating coil is completed by way of the bridging member 236, the conductors 390 and 391, and the bridging member 383, now in its second position. The energizing circuit is then the same as already traced.

Similarly for the third and subsequent positions of the selector switch I, the energizing circuit is traced through the successive contacts bridged by the member 236 and through the corresponding positions of the multiple-point switch 383. Thus in the twenty-first position of switch I, the energizing circuit is completed through the conductors 392 and 393, and thence by the bridging member 383 which then occupies its twenty-first position. The operation of the switch I to its twenty-second position transfers the energizing circuit by way of conductor 288 to the bridging member 242 of stepping switch II. At the same time, the bridging member 383 completes a circuit through its first contact and the foregoing operations are repeated for operation of the stepping switch II through its several positions.

It will be observed the polarity of the energizing circuits for the bank-identifying lights "1," "2" and "7" is the reverse of that shown in Fig. 6. For example, the energizing circuit for the No. 1 bank-indicating light may be traced from the supply line 195, by conductor 395, bank-identifying light "1," bridging member 237, contacts 244, and by conductor 396 to the other supply line 205. This change of connection is utilized for the operation of range-changing relays. The details of this feature will be described in connection with Fig. 13.

It will now be assumed manual operation is desired. The selector switch 46 is operated to its "M" or "Manual" position. The operating coil 193 of the blocking relay 194 is thereby de-energized to render effective the contacts 111 and the contacts 115 (not shown) for insuring that the slidewire driving motor will be at standstill during the time the printwheel is in contact with the record chart. The relays 198a and 375 remain in their energized positions. The energizing circuit for the relay 198a is the same as for the relay 198 of Fig. 6. The energizing circuit for the relay 375, with the switch 46 in the automatic position, may be traced from the supply line 195, by conductor 207, contact 208, conductor 209, fast-clearing contact 315, conductor 211, contact 378 of relay 375, conductor 395, the operating coil of relay 375, and by conductor 396 to the other supply line 205. As described in connection with Fig. 6, the operation of the switch 46 to its manual position does not interrupt this energizing circuit inasmuch as a circuit is completed through the contact 313 before the interruption of the circuit through the contact 208.

With the switch 46 in the manual position, the operating coil of the relay 375 is directly energized through a circuit which may be traced from the supply line 195, by contact 397, conductor 398, the operating coil of the relay 375, and by conductor 396 to the other supply line 205.

The system will now function as explained in connection with Fig. 6. The push-button 47 may be operated rapidly to select any desired condition-responsive device. When it is desired to return the system to automatic operation in a minimum of time, the selector switch 46 is operated to the automatic position and thence to the fast-clearing position. As already explained, all contacts thereof occupy their illustrated "Automatic" positions except the fast-clearing contact member 315 which, in the fast-clearing position, interrupts the circuit therethrough. While the switch 46 momentarily remains in the fast-clearing position, the interruption of the aforesaid circuit serves to de-energize relays 198a and 375. Hence, an energizing circuit for the operating coils of the respective stepping switches I—VII is completed, which may be traced from the supply line 195, by conductor 207, contact 208, conductor 209, fast-clearing contact member 315, conductor 211, contact 316 of relay 198a, contacts 235, 293 and 294 of switches I, II and VII, conductor 295, and by contact 317 to the conductor 226 which, it will be remembered, serves to energize the respective operating coils 223, 252 and 262 of stepping switches I, II and VII.

As in the case of Fig. 6, the stepping switches will rapidly operate in succession until each occupies its last position. When the stepping switch VII reaches its last position, an energizing circuit is completed through the bridging member 278 for the relay 282, this circuit including the contacts 370 of relay 375. As before, the closure of the relay 282 returns all switches to their first positions. The relay 375 is also energized when the switches have been operated to their last positions. This energizing circuit is the same as above traced down to the conductor 226. It extends therefrom by way of contact 228, bridging member 231, conductors 254 and 256, bridging member 257, conductors 264 and 265, conductor 267, bridging member 268, conductor 400, contact 377 of relay 375, conductor 395, the operating coil, and by conductor 396 to the other supply line 205. Operation of the relay 375 completes its own holding circuit through the contacts 370 prior to the interruption of the energizing circuit just traced.

It will be assumed that the printwheel 33 and the mechanical synchronizing switch 380 occupy positions remote from their first positions at the time selector switch I is returned to its first position. In contrast with the system of Fig. 6, the stepping switch I continues operation. The energizing circuit for the operating coil 223 continues to be energized through the contacts 316 of relay 198a. However, assuming that the stepping switch I arrives at its twenty-first position when synchronizing switch 380 is in its twenty-first position, an energizing circuit is completed for the operating coil of relay 198a. This circuit may be traced from the supply line 195, by conductor 238, contact 239, bridging member 236, conductors 392 and 393, bridging member 383, conductor 384, contacts 376 of relay 375, conductor 385, contacts 305 of relay 198a, its operating coil, and by conductor 213 to the other supply line 205. Consequently, the relay 198a is energized and through its contacts 212 completes its own holding circuit prior to interruption of the energizing circuit just traced through the contacts 305. Of course, the operation of the relay 198a to its energized position interrupts the circuit to the operating coil 223 which was traced through the contacts 317. This stops the selector switch I in its twenty-first position and in synchronism with the printwheel 33 and the synchronizing switch 380. Automatic operation is then resumed in manner already fully explained.

It will be recalled that in Fig. 5, two relays, 167 and 172, were illustrated to change the connections to the compensating network to provide desired corrections for thermocouples of differing range. One of these relays, the relay 172, was also illustrated in Fig. 6, together with a detailed description of its operation.

Figure 13:
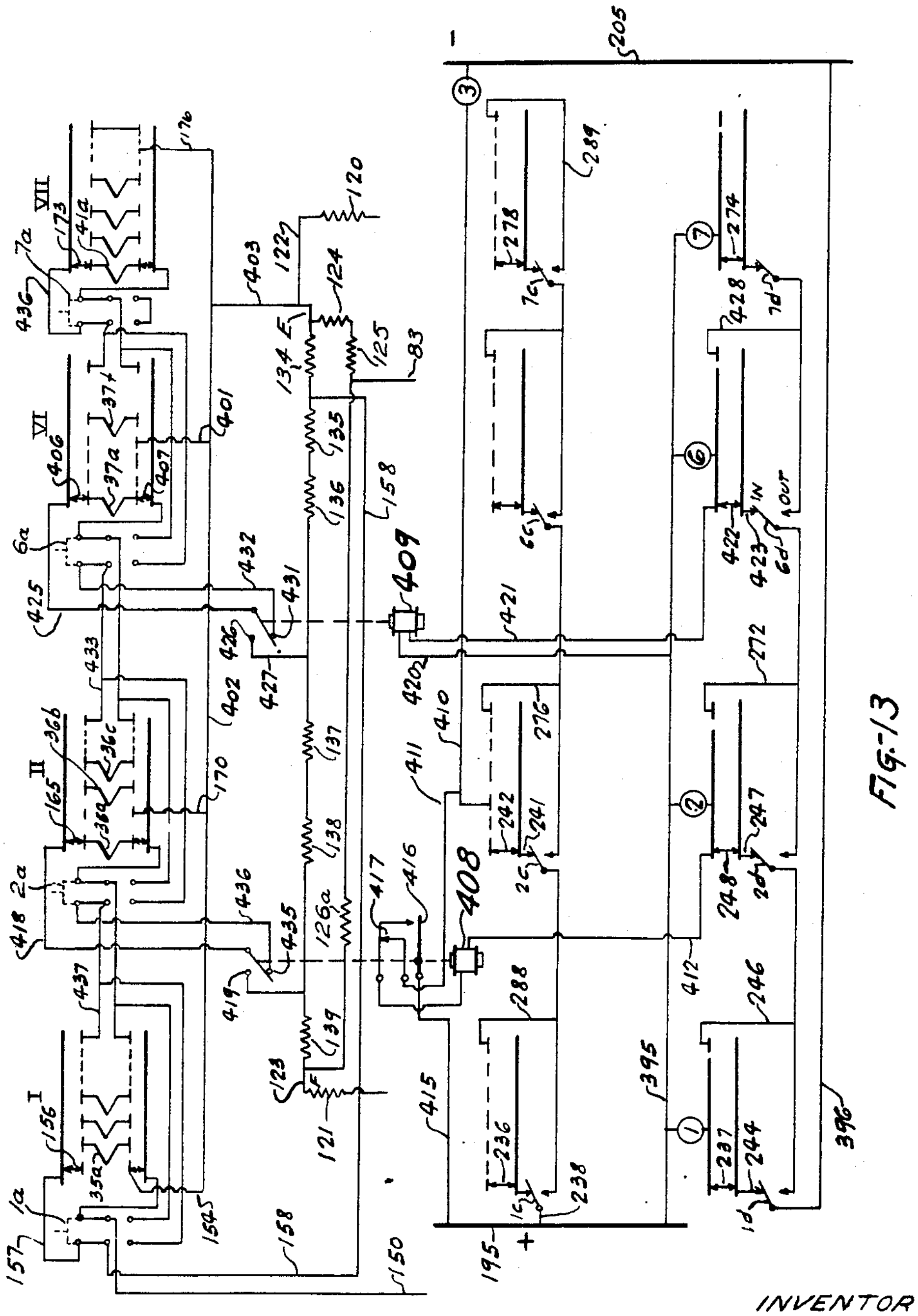
Fig. 13 is a wiring diagram of the modification of Fig. 12, including a number of the circuit elements shown and not shown in Fig. 12.

The system of Fig. 12 may also include the features of the system of Fig. 13. In accordance with this further modification of the invention, the printwheel operates to print distinctive symbols for the identification of the respective blanks of thermocouples. All such symbols, "1." to "7.," are printed at the upper limit of the record chart although the lower limit may be utilized, or the staggered system of Figs. 1-9 may be utilized.

Referring to Fig. 13, it will be observed the conductors 154, 170, 401 and 176 leading respectively from the point-identifying positions of the selector switches I, II, VI and VII, are connected together by the conductor 402 and each identifying point is connected by this conductor and conductor 403 to the compensating network at the point E as it appears in Figs. 5 and 12. It will be observed the compensating network does not include the individual point-identifying resistors 127-133 but it does include the cold-junction compensating resistors 124, 125, 126a and 134—139 which would have the same ratio of resistance to each other as in Fig. 4. Hence, the effect of completing the connection to the point E as above described is to apply a relatively high voltage by conductors 83 and 150 which lead to the measuring circuit. This relatively high voltage causes the slidewire motor 63 to drive the printwheel to the uppermost limit of the record chart. It is brought to standstill at this limit by a suitable stop. The construction and operation of such a stop or stopping means are well understood in the art and, therefore, have not been illustrated herein.

The operation of the stepping switches I, II, VI and VII is identical with that of corresponding banks illustrated in Figs. 5 and 6, although in Fig. 13, an additional switch, the stepping switch VI, has been included. It is also provided with an "in" and "out" switch 6a, and with bridging members 406 and 407. The additional stepping switch has been illustrated further to explain the operation of the range-changing relays 408 and 409. In accordance with the invention, these two relays provide great flexibility in that thermocouples of differing range may be connected to the respective stepping switches, or thermocouples of differing range may be connected to the same stepping switch. Further in accordance with the invention, these relays are under the control of the point-indicating and bank indicating decks of the respective stepping switches.

With the parts in their illustrated positions, it will be observed that the thermocouples of switch I are connected by conductor 158 to the juncture of compensating resistors 134 and 135. As explained in connection with the modification of Figs. 1-9, these thermocouples, 35a et seq. may be for a low range of temperatures and of the copper-constantan type or the copper-copnic type. The thermocouple 36a of switch II may also be for the low range while the remaining thermocouples including thermocouples 36b and 36c may be for a differing range. After operation of the bridging member 236 of selector switch I to its last position, the energizing circuit is transferred from the supply line 195, by conductor 288 to the bridging member 242. In its third position, an energizing circuit is completed by way of conductor 410 for the third or No. 3 point-indicating light, and by way of conductor 411 and contact 417 to the operating coil of the relay 408. This relay circuit continues by way of conductor 412, bridging member 248 of stepping switch II, contact 247, conductor 246, bridging member 237 of switch I, contact 244, and by conductor 396 to the other supply line 205. The relay 408 in moving to the energized position completes its own holding circuit which may be traced from the supply line 195, by conductor 415, and contact 416, to the operating coil of relay 408.

It will be observed this holding circuit is maintained throughout the remainder of the thermocouple circuit-controlling positions of selector switch II. In the last, or transfer position, this holding circuit is interrupted and the relay 408 moves to its de-energized position.

Upon the aforesaid energization of relay 408 the thermocouple 36b and those following are connected, by bridging member 165, conductor 418, and contact 419 of relay 408, to the juncture of resistors 138 and 139. The connection of the thermocouples to the compensating network at this point introduces a voltage which varies in magnitude to compensate for variations due to changes in the cold junction temperature. After the measurement and recordation of the temperatures of the remaining thermocouples of selector switch II, the selector switch II transfers the respective circuits to the next selector switch, in Fig. 13 illustrated as selector switch VI.

As the bridging member 248 is moved to its last position, it not only de-energizes relay 408 but it also completes an energizing circuit for the relay 409. This circuit may be traced from the supply line 195, by conductors 395 and 420 to the operating coil of relay 409, conductor 421, bridging member 422 of selector switch VI, contact 423, conductor 272, bridging member 248, contact 247, conductor 246, bridging member 237, contact 244, and by conductor 396 to the other supply line 205.

Inasmuch as the operating coil of relay 409 is energized by the circuit traced through the bridging member 422, it will be understood the relay 409 will remain energized during the first twenty-one positions of selector switch VI. While energized, the thermocouples of switch VI will be connected to the juncture of compensating resistors 136 and 137 by a circuit which includes bridging member 406, conductor 425, contact 426 of relay 409, and conductor 427. Hence the thermocouples 37a—37t may all be of a still different range.

As the bridging member 422 of selector switch VI is moved to its last or twenty-second position, the foregoing energizing circuit for the relay coil 409 is broken. The bank-identifying circuit, however, is transferred to stepping switch VII by way of conductor 428. The thermocouples under the control of stepping switch VII are then connected to the juncture of resistors 134 and 135 through a circuit which may be traced by way of bridging member 173, conductor 436, the left-hand side of switch 7a, bridging member 406, conductor 425, contacts 431 of relay 409, conductor 432, the left-hand side of switch 6a, conductor 433, bridging member 165, conductor 418, contacts 435 of relay 408, conductor 436, the left-hand side of switch 2a, conductor 437, bridging member 156, conductor 157, the left-hand side of switch 1a, and by conductor 158 to the juncture of resistors 134 and 135. It will be remembered the thermocouples of selector switch I were also connected to the compensating network between resistors 134 and 135. Hence, the thermocouples of banks I and VII may be for the same low range of temperature. Now that the further modifications of the invention have been explained, it will be seen that thermocouples of one or more ranges may be under the control of a single bank. Furthermore, the thermocouples of a higher range may be followed by thermocouples of a lower range or vice versa. In accordance with the invention, the thermocouples of each particular range are connected to the correct point on the compensating network to insure correct compensation for the differing characteristics thereof.

In accordance with the invention, measuring systems of great flexibility may be readily provided to meet widely differing conditions. By utilizing the principles disclosed in connection with the several modifications, temperatures may be either indicated or recorded, or simultaneously indicated and recorded at relatively high speed. The number of temperatures which may be indicated and/or recorded by a single instrument is not limited by the invention. The same instrument may be utilized to measure and record any number of temperatures. Moreover, the operation may be rapidly changed from manual to automatic with the system itself providing automatic synchronizing features to insure that each selector switch shall be operated in synchronism with the printwheel.

What is claimed is:

1. A multiple-point recorder system comprising a plurality of banks of selector switches, each having a plurality of circuit-controlling contacts, a measuring circuit, condition-responsive means individually connected to a plurality of said contacts for connection to said measuring circuit, means including said switches for cyclically recording in predetermined sequence the magnitude of each said condition, and means for excluding one or more of said banks from the recording cycle without disturbing the cyclical recording of the condition-responsive means controlled by said remaining banks comprising a coil for each of said banks for respectively controlling the operation thereof, an energizing circuit extending from one of said banks to another for energizing first one and then another of said coils, and a transfer switch for each of said coils respectively operable to include or exclude its associated coil from said energizing circuit.

2. A multiple-point recorder system comprising a plurality of banks of selector switches, each having a plurality of circuit-controlling contacts, a measuring circuit, condition-responsive means individually connected to a plurality of said contacts for connection to said measuring circuit, means including said switches for cyclically recording in predetermined sequence the magnitude of each said condition, means for excluding one or more of said banks from the recording cycle without disturbing the cyclical recording of the condition-responsive means controlled by said remaining banks comprising a coil for each of said banks for respectively controlling the operation thereof, an energizing circuit extending from one of said banks to another for energizing first one and then another of said coils, and a transfer switch for each of said coils respectively operable to include or exclude its associated coil from said energizing circuit, and means associated with said measuring circuit and operable under the control of certain of said contacts for producing the recording of distinctive symbols, each indicative of a selected group of said condition-responsive means.

3. A multiple-point recorder system comprising a plurality of banks of multiple-point selector switches, each having a plurality of circuit-controlling contacts, a measuring circuit, condition-responsive means individually connected to a plurailty of said contacts for connection to said measuring circuit, means including said switches for cyclically recording in predetermined sequence the magnitude of each said condition, means for excluding one or more of said banks from the recording cycle without disturbing the cyclical recording of said condition-responsive means of said remaining banks comprising a coil for each of said banks for respectively controlling the operation thereof, an energizing circuit extending from one of said banks to another for energizing first one and then another of said coils, and a transfer switch for each of said coils respectively operable to include or exclude its associated coil from said energizing circuit, manual means for producing operation of said switches to any desired point, and a transfer switch for connecting said energizing circuit to said manual means for control thereby.

4. A multiple-point recorder system comprising a plurality of multi-point selector switches operable in succession through a plurality of switching positions, each said switch having a plurality of decks of circuit-controlling contacts, a measuring circuit, condition-responsive means individual to each of a plurality of contacts of each of said switches, means including said contacts for connecting said condition-responsive means in sequence to said measuring circuit, visual indicating means rendered distinctive under the control of each said multi-point switch for identification thereof, visual indicating means, common to said multi-point switches, rendered distinctive by successive operation of each switch through its multiple points, and means under the control of each multi-point selector switch for transferring control of said common indicating means to the next of said multi-point switches to be operated through its said plurality of positions.

5. A multiple-point recorder system comprising a plurality of banks of selector switches, each said switch having a plurality of decks of circuit-controlling contacts, a measuring circuit, condition-responsive means individual to each of a plurality of contacts of each of said banks and adapted to be connected in sequence to said measuring circuit, common visual indicators for said condition-responsive means of said banks, a visual indicator for each bank of said selector switches, means under the control of one of said decks of contacts for rendering distinctive a visual indicator for each bank, and means operable first under the control of one bank and then under the control of the other of said banks for rendering distinctive one of said common indicators for each condition-responsive means connected to said measuring circuit.

6. A multiple-point recorder system comprising a plurality of banks of multiple-point switches, each including a plurality of circuit-controlling contacts, a measuring circuit, condition-responsive means individual to a plurality of the contacts of each bank and adapted to be connected in predetermined sequence to said measuring circuit, means for operating first one bank and then the next bank through its switching positions to connect in succession the condition-responsive means of one bank and then those of the other bank of said measuring circuit, visual indicators for each said bank, energizing circuits for said indicators, one of which circuits is continuously closed while one bank is operated through its said switching positions and other of the remaining of said circuits are respectively continuously closed as other of said banks are operated through their said switching positions, for rendering distinctive the indicator corresponding with the bank then in operation, common signalling means for the individual positions of each of said banks, and signalling circuits operable under the control of first one bank and then in succession by said other banks for rendering said individual means distinctive to indicate the particular switching position of each of said banks.

7. In a multiple-point recorder system comprising a plurality of banks of multiple-point switches, each including a plurality of circuit-controlling contacts, a measuring circuit, condition-responsive means individual to a plurality of the contacts of each bank and adapted to be connected in predetermined sequence to said measuring circuit, the combination of signalling means in turn operable under the control of each bank for visually indicating at all times the switch position of said bank and for indicating at all times the particular bank through which said condition-responsive means is connected to said measuring circuit, and means operable by the movement of one bank to its last position for transferring said measuring and signalling operations to the control of the next bank.

8. In a multiple-point recorder system comprising a plurality of banks of multiple-point switches, each including a plurality of circuit-controlling contacts, a measuring circuit, condition-responsive means individual to a plurality of the contacts of each bank and adapted to be connected in predetermined sequence to said measuring circuit, the combination of signalling means operable under the control of each bank in turn for visually indicating the switch position of said bank and for indicating the particular bank through which said condition-responsive means is connected to said measuring circuit, circuit connection completed by the movement of one bank to its last position for transferring said measuring and signalling operations to the control of the next bank, and means for rendering said banks effective in predetermined sequence with predetermined banks excluded and predetermined banks included in the operation of the system.

9. The combination with a recorder having a measuring circuit, condition-responsive means of differing range, a compensating network, and switching means connecting each condition-responsive means of a differing range to said measuring circuit and to a selected part of said compensating network, of means for connecting in said measuring circuit a selected part of said compensating network for operation of said recorder to produce a distinctive visual indication representative of each particular range of condition-responsive means to be connected to said measuring circuit and to said compensating network.

10. The combination with a recorder having a measuring circuit, condition-responsive means of differing range, a compensating network, and switching means connecting each condition-responsive means of a differing range to said measuring circuit and to a selected part of said compensating network, of means for connecting in said measuring circuit different selected parts of said compensating network for operation of said recorder to produce a distinctive record representative of each particular range of condition-responsive means to be connected to said measuring circuit and to said compensating network.

11. The combination with a recorder having a record chart, printing means, and a measuring circuit, condition-responsive means of differing range, a compensating network, and switching means connecting each condition-responsive means of a differing range to said measuring circuit and to a selected part of said compensating network, of means for connecting in said measuring circuit different selected parts of said compensating network for movement of said printing means along said chart to print thereon a record distinctive by its position on said chart and representative of each particular range of condition-responsive means to be connected to said measuring circuit and to said compensating network.

12. In a measuring system having a plurality of thermocouples of differing range of temperature sensitivity, the combination of a plurality of multiple-point switches, a measuring circuit, a compensating network, means including said switches and at least one range-changing relay for connecting said thermocouples in sequence between said measuring circuit and said compensating network, said multiple-point switches having circuit-controlling contacts, one pair for each thermocouple, and additional pairs of contacts, switch-position indicating means operable under the control of said additional pairs of circuit controlling contacts for indicating the position of each of said multiple-point switches, switch-indicating means, control circuits including said additional pairs of contacts for energizing in succession said switch-indicating means as each of said multiple-point switches becomes effective to connect thermocouples between said measuring circuit and said compensating network, said at least one range-changing relay having contacts for connecting thermocouples of one range to said compensating network at one point thereof and additional contacts effective upon energization of said relay for connecting thermocouples of differing cold-junction temperature responsiveness to a different point of said compensating network whereby correct compensation is introduced into said system to take care of differing cold-junction characteristics of said thermocouples of differing range.

13. In a measuring system having a plurality of thermocouples of differing range of temperature sensitivity, the combination of a plurality of multiple-point switches, a measuring circuit, a compensating network, means including said switches and at least one range-changing relay for connecting said thermocouples in sequence between said measuring circuit and said compensating network, said multiple-point switches having circuit-controlling contacts, one pair for each thermocouple, and additional pairs of contacts, switch-position indicating means operable under the control of said additional pairs of contacts for indicating the position of each said multiple-point switch, switch-indicating means, control circuits including said additional pairs of contacts for energizing in succession said switch-indicating means as each of said multiple-point switches becomes effective to connect thermocouples between said measuring circuit and said compensating network, said at least one range-changing relay having contacts for connecting thermocouples of one range to one point of said compensating network and having additional contacts effective upon energization of said relay to connect thermocouples of a differing range to another point of said network, an energizing circuit for said relay which includes one of said first pairs of contacts of one of said selector switches and one of said additional pairs of contacts whereby said relay is energized when a selected multiple-point switch is effective to connect predetermined thermocouples between said measuring circuit and said compensating network.

14. The combination with a thermocouple, of a system of measuring the voltage of said thermocouple comprising a measuring circuit of the potentiometer type and which includes a slidewire, resistance means in parallel therewith, and a source of potential for producing a voltage which balances that of said thermocouple, a compensating network connected to said same source of potential for producing a corrective voltage which varies in a predetermined manner to correct for the cold-junction characteristic of said thermocouple, said resistance means in parallel having said slidewire with a neutral point therein, means including resistors interconnecting said potentiometer and said compensating network, said network including resistors establishing a neutral point therein, and a low resistance conductor interconnecting said neutral points.

15. A measuring system comprising at least one thermocouple having the characteristic of producing a voltage of small magnitude in response to variations of the temperature under measurement, a balanceable measuring circuit for measuring the magnitude of said voltage, a cold-junction compensating network for said thermocouple, a source of supply common to said measuring circuit and said compensating network, resistance means in said measuring circuit and in said compensating network for establishing a predetermined voltage ratio in said network and in said measuring circuit for establishing points of equipotential therein, and a conductor interconnecting said points of equipotential respectively located in said network and in said measuring circuit.

16. A balanceable measuring system comprising a measuring circuit of the potentiometer type, a temperature-responsive device having a cold junction and a hot junction for producing a voltage of small magnitude which varies in response to the magnitude of said condition, a cold-junction compensating network for producing a corrective voltage which varies in a predetermined manner, electrical conducting means interconnecting said potentiometer circuit and said compensating network, means connecting said device between said potentiometer circuit and said compensating network, resistance means included in said potentiometer circuit and in said compensating network for establishing predetermined resistance ratios in said network and in said measuring circuit for establishing points of substantially equipotential therein, said resistance means including resistors of relatively high resistance between said potentiometer circuit and said compensating network, and a low resistance conductor interconnecting said points of equipotential.

17. A measuring system comprising a measuring circuit of the potentiometer type, at least one thermocouple remotely located from said measuring circuit, a compensating network remotely located from said measuring circuit, circuit-forming means including a plurality of conductors and slidable connectors for interconnecting said thermocouple, said measuring circuit and said compensating network, a common source of supply for said measuring circuit and said compensating network, said circuit-forming means including resistors for establishing a relatively high resistance between said source of supply and said compensating network, said circuit-forming means including additional resistors for establishing predetermined points of substantially the same potential in said network and in said measuring circuit, and said circuit-forming means also including a low-resistance conductor interconnecting said points.

18. A multiple-point recorder system comprising a measuring circuit, switching means operable automatically through a plurality of circuit-controlling positions upon successive energizations of its operating coil, condition-responsive means for connection in sequence by said switching means to said measuring circuit, means operable through a plurality of positions for printing a distinctive symbol for each of said condition-responsive means, and means for synchronizing the operation of said switching means with said printing means comprising a second switching means, means for periodically operating said second switching means whenever said printing means occupies a predetermined position, and means operable under the control of said second switching means to reestablish synchronism between said first-named switching means and said printing means.

19. A multiple-point recorder system comprising a measuring circuit, switching means operable automatically through a plurality of circuit-controlling positions upon successive energizations of its operating coil, condition-responsive means for connection in sequence by said switching means to said measuring circuit, means operable through a plurality of positions for printing a distinctive symbol for each of said condition responsive means, means for synchronizing the operation of said switching means with said printing means comprising means including a second switching means operable in fast succession repeatedly to energize said operating coil for rapidly operating said switching means until it occupies a predetermined synchronized position with respect to said printing means, and means for retaining said switching means in said synchronized position until said printing means advances to a further position.

20. A multiple-point recorder system comprising a measuring circuit, switching means operable automatically through a plurality of circuit-controlling positions upon successive energizations of its operating coil, condition-responsive means for connection in sequence by said switch means to said measuring circuit, means operable through a plurality of positions for printing a distinctive symbol for each of said condition-responsive means, means for synchronizing the operation of said switching means with said printing means comprising means including a second switching means operable in fast succession repeatedly to energize said operating coil for rapidly operating said switching means until it occupies a predetermined position with respect to said printing means, and means thereafter operable to advance said first-named switching means to its next circuit-controlling position after each said printing operation.

21. The combination set forth in claim 20 including a circuit-controller, and a transfer switch operable from a first to a second position to transfer control of said first-named switching means from said switch-advancing means to said circuit controller, said rapidly operating means being operable upon return of said transfer switch to its first position for establishing synchronized operation between said printing means and said switching means.

22. A multiple-point recorder system comprising a measuring circuit, multiple-point switching means operable in sequence through its switching positions, condition-responsive means for connection in sequence by said switching means to said measuring circuit, selective means operable between an automatic position and a manual position for establishing automatic or manual control of said switching means, a printwheel, means for operating said printwheel through a plurality of positions in predetermined relation with said switching means and for printing in each position thereof a distinctive symbol for each of said condition-responsive means, manual means operable with said selective means in its manual position for operating said switching means to connect any selected condition-responsive means to said measuring circuit with said printwheel in any of its said positions, means operable upon return of said selected means to its automatic position for automatically returning said switching means to a predetermined position to reestablish said predetermined relation with said printwheel, and means modifying the action of said automatic means for rapidly operating said switching means through its circuit-controlling positions until it occupies a position corresponding with that of said printwheel.

23. A multiple-point recorder system comprising a measuring circuit, a plurality of multiple-point switches each operable in sequence through a plurality of circuit-controlling positions, automatic means for automatically operating said switches one after another through their said positions, a plurality of thermocouples respectively under the control of a plurality of said circuit-controlling positions of said switches for connection thereby in sequence in said measuring circuit, said automatic means retaining said switches in each circuit-controlling position for a predetermined time interval, selective means for establishing automatic or manual control of said switches, means operable during said automatic operation for printing a symbol which visually indicates when each switch connects its thermocouples to said measuring circuit, means including said measuring circuit for operating said printing means during said automatic operation in synchronism with said switches to produce a record of the magnitude of the condition to which each thermocouple is subjected, manual means operable with said selective means in its manual position for producing operation of said switches through succession in their respective circuit-controlling positions whereby any particular thermocouple, without maintaining synchronism with said printing means, may be quickly connected to said measuring circuit, means modifying the action of said automatic means for rapidly returning said switches to predetermined positions, and means driven in predetermined relation with said printing means for interrupting said rapid operation to establish synchronization of said switches with said printing means for subsequent automatic operation.

24. A multiple-point recorder system comprising a measuring circuit, a plurality of multiple-point switches each operable in sequence through a plurality of circuit-controlling positions, automatic means for operating said switches one after another through their said positions, a plurality of thermocouples respectively under the control of a plurality of said circuit-controlling positions of said switches for connection thereby in sequence to said measuring circuit, said automatic means retaining said switches in said circuit-controlling positions for a predetermined time interval, selective means for establishing automatic or manual control of said switches, means for printing a symbol which visually indicates when each switch connects its thermocouples to said measuring circuit, means including said measuring circuit for operating said printing means in synchronism with said switches during automatic operation to produce a record of the magnitude of the condition to which each thermocouple is subjected, manually operable means, means operable with said selective means in its manual position and under control of said manually operable means for operating said switches in succession through their respective circuit-controlling positions whereby any particular thermocouple without maintaining synchronism between said switches and said printing means may be quickly connected to said measuring circuit, and means modifying the operation of said automatic means for rapidly operating said switches through their circuit-controlling positions until all switches except one occupy predetermined positions and for continuing the operation of said one switch, and means mechanically driven in phase with said printing means for stopping said one switch in synchronism with said printing means.

25. A multiple-point recorder system comprising a measuring circuit, multiple-point switching means operable in sequence through a plurality of circuit-controlling positions, condition-responsive means individual to a plurality of said circuit-controlling positions for connection in sequence to said measuring circuit, means movable across a chart and also into engagement with it for recording the magnitude of each said condition a predetermined time interval after connection of a condition-responsive means to said measuring circuit, manual means for operating said switching means at any time to another circuit-controlling position, and means made effective by said manual means for holding said recording means stationary with respect to its movement across said chart during each recording operation of said recording means.

26. A multiple-point recorder system including a record chart and comprising a measuring circuit, multiple-point switching means having a plurality of circuit-controlling positions, means responsive to a plurality of different conditions, means including said switching means for connecting said condition-responsive means to said measuring circuit, printing means movable across said chart and operable through a plurality of printing positions, means including said measuring circuit for operating said printing means across said chart and into engagement with it to produce a record of the magnitude of each of said conditions, manually operable means for producing movement of said switching means to any desired one of its circuit-controlling positions, and means for preventing movement of said printing means across said chart during each printing movement toward said chart.

27. A multiple-point recorder system including a record chart and comprising a measuring circuit, multiple-point switching means having a plurality of circuit-controlling positions, individual means responsive to a plurality of different conditions, means including said switching means for individually connecting said condition-responsive means to said measuring circuit, means operable under the control of a selector switch for producing manual or automatic operation of said multiple-point switching means, printing means operable through a plurality of printing positions, means including said measuring circuit for moving said printing means across said chart in accordance with the magnitude of the condition then under measurement, and means operable when said selector switch is in a position for manual operation for preventing movement of said printing means across said chart during each printing operation of said printing means and after said selector switch has been operated to a position for automatic operation for preventing movement of said printing means across said chart during the first printing operation following movement of said selector switch to said position for said automatic operation.

28. In a multiple-point recorder system having a plurality of groups of condition-responsive means and a record chart upon which may be recorded the magnitude of the condition to which each of said means is subjected, the combination of a printwheel having symbols in number at least equal to the number of condition-responsive means of each of said groups, measuring means for producing successive operations of said printwheel to record with a different symbol the magnitude of the condition to which each of said condition-responsive means in each group is subjected, and means for actuating said measuring means to operate said printwheel to produce a distinctive record on said chart for identifying each of said groups of condition-responsive means.

29. In a recorder having a measuring circuit successively responsive to each of a plurality of thermocouples, a record chart, and a printwheel having a predetermined number of symbols for printing in succession on said record chart symbols whose positions on said chart are indicative of the magnitudes of the conditions to which said thermocouples are subjected and which by the distinctive character of the symbols identifies the particular thermocouple which has produced each indication and record of the magnitude of the condition to which it was subjected, the combination of a plurality of multiple-point switches each cyclically operable successively through a plurality of circuit-controlling positions, circuit-means rendered effective by successive operations of said multiple-point switches to connect said thermocouples in succession to said measuring circuit, means for controlling the operations of said multiple-point switches including an energizing circuit, a circuit-controller periodically operated to make and break said energizing circuit, means including one of said multiple-point switches for completing said energizing circuit for operation of said switch through its plurality of circuit-controlling positions, said last-named switch in the last position thereof transferring said energizing circuit to another of said multiple-point switches, and each of said multiple-point switches to which said circuit has been transferred thereafter transferring said energizing circuit to another of said multiple-point switches, the last of said multiple-point switches to which said circuit has been transferred including contacts closed in the last position thereof, and means including a relay energized by closure of said last-named contacts for returning said multiple-point switches to their initial positions for completion of a further cycle of operations.

30. The combination set forth in claim 29 in which said energizing circuit is completed through a synchronizing means which prevents advancement of said multiple-point switches except when said printwheel occupies a predetermined position with respect thereto.

31. The combination set forth in claim 29 in which said energizing circuit is completed through a selector switch operable between a manual and an automatic position, said energizing circuit being completed by said circuit controller with said selector switch in its automatic position, a manually operable switch, said selector switch transferring said energizing circuit from control by said circuit controller to control by said manually operable switch for completion of said energizing circuit whenever said manually operable switch is operated whereby said multiple-point switch may be operated at will to any particular position thereof.

32. The combination set forth in claim 29 in which said energizing circuit includes a relay operable between energized and de-energized positions and during said cycle of operations occupying one of said positions, means for producing operation of said relay from said one position thereof to its other position, a fast-clearing circuit for said switches, and means operable upon said operation of said relay for completing said fast-clearing energizing circuit for said multiple-point switches, said fast-clearing energizing circuit including circuit interrupters for producing rapid operation of said multiple-point switches through a cycle, and means for operating said relay to the first-named position thereof when said multiple-point switches occupy predetermined positions.

33. The combination set forth in claim 29 in which said energizing circuit includes a relay operable between energized and de-energized positions and during said cycle of operations occupying one of said positions, means for producing operation of said relay from said one position thereof to its other position, a fast-clearing circuit for said switches, means operable upon said operation of said relay for completing said fast-clearing energizing circuit for said multiple-point switches, said fast-clearing circuit including circuit interrupters for producing rapid operation of said multiple-point switches through a cycle, means for operating said relay to the first-named position thereof when said multiple-point switches occupy predetermined positions, and circuit-controlling means operable in timed relation with said printwheel for stopping one of said multiple-point switches in a position which corresponds with the symbol next to be printed by said printwheel on said record chart.

34. In a multiple-point recorder system having a measuring circuit and a printwheel for printing on a record chart ten numerals, from 0 to 9 inclusive, the combination of switching means operable automatically through a number of circuit-controlling positions materially greater than the ten numerals of said printwheel, condition-responsive means individual to a plurality of said circuit-controlling positions for connection in sequence thereby to said measuring circuit, means for moving said printwheel laterally of said chart to indicate the magnitude of each condition to which each condition-responsive means is subjected, and means operable in lieu of a condition-responsive means for operating said printwheel to print the numerals of said printwheel in distinctive positions on the record chart for identification of a plurality of selected groups of condition-responsive means.

35. In a multiple-point recorder system having a measuring circuit and a printwheel for printing on a record chart the ten numerals from 0 to 9 inclusive, the combination of switching means operable automatically through a number of circuit-controlling positions materially greater than the ten numerals of said printwheel, condition-responsive means individual to a plurality of said circuit-controlling positions for connection in sequence thereby to said measuring circuit, means for moving said printwheel laterally of said chart to indicate the magnitude of each condition to which each condition-responsive means is subjected, means operable in lieu of a condition-responsive means for operating said printwheel to print the numerals 0, 1, 2 et cetera each in a distinctive position on the record chart for identification of selected groups of nine condition-responsive means and means for synchronizing the operation of said switching means with said printwheel comprising electrical circuits completed in predetermined relation with operation of said printwheel and with operation of said switching means to maintain synchronism therebetween.

36. In a multiple-point recorder system comprising a plurality of switches each having a plurality of circuit-controlling contacts, a measuring circuit, condition-responsive means connected in groups to the circuit-controlling contacts of each switch and arranged for successive and individual connection to said measuring circuit, and means for operating a first of said switches through its circuit-controlling positions and then for operating the remaining switches through their circuit-controlling positions for said successive and individual connection of said condition-responsive means to said measuring circuit, the combination of visual indicating means equal in number to a predetermined number of positions of one of said switches for identification of a first group of condition-responsive means, means including an indicator energizing circuit and additional multiple-position switches operable with said first-named switches for rendering distinctive a particular indicating means for each corresponding position of each of said first-named switches which connects a condition-responsive means to said measuring circuit, additional indicating means equal in number to said groups of said condition-responsive means, and means including an indicator energizing circuit and additional multiple-position switches operable with each of said first-named switches for rendering distinctive that one of said last-named indicating means which corresponds with the particular group of condition-responsive means then connected to said measuring circuit, each of said additional switches including means for transferring the control of said indicating means from one of said additional switches to another as said first-named switches are successively operated through their respective circuit-controlling positions.

37. The combination set forth in claim 36 in which there are provided circuit-controllers for including or excluding from said measuring circuit condition-responsive means under the control of one or more of said first-named switches and for simultaneously placing the control of said visual indicating means under corresponding additional multiple-position switches, or bypassing the control thereof to other of said additional multiple-position switches.

38. A multiple-point recorder system including a chart and comprising a balanceable measuring circuit of the potentiometer type, a group of thermocouples responsive to temperatures within a predetermined range, a group of additional thermocouples responsive to temperatures within a different range, means including a resistor network for compensating in said measuring circuit for variations in the cold-junction temperatures of said thermocouples, circuit-controlling means for connecting said thermocouples in succession to said measuring circuit, and means operable under the control of said circuit-controlling means for connecting at least a part of said network in said measuring circuit in lieu of a thermocouple to produce a distinctive indication on said chart of the particular temperature range of each of said groups of thermocouples connected in said measuring circuit.

39. A multiple-point recorder system comprising a measuring circuit, a plurality of condition-responsive means, multiple-point switching means operable in sequence through its switching positions for connecting said condition-responsive means in sequence to said measuring circuit, selective means movable between manual and automatic positions for establishing automatic or manual control of said switching means, a printwheel, means for operating said printwheel through a plurality of positions in predetermined relation with said switching means and for printing in each position thereof a distinctive symbol for each of said condition-responsive means, manual means operable when said selective means is in its manual position for operating said switching means to connect selected condition-responsive means to said measuring circuit with said printwheel in any of its said positions, and means operable upon return of said selective means to its automatic position for automatically returning said switching means to a predetermined position to reestablish their said predetermined relation with said printwheel.

40. A multiple-point recorder system comprising switching means having a plurality of circuit-controlling positions, a measuring circuit, condition-responsive means in number corresponding with a plurality of said positions, indicating means for identifying each condition-responsive means as it is connected to said measuring circuit including a second switching means having a plurality of circuit-controlling positions, energizing circuits completed by said second switching means for rendering effective said identifying means continuously to identify each condition-responsive means during the entire period it is connected to said measuring circuit, a third switching means having a plurality of circuit-controlling positions corresponding in number with predetermined groups of said condition-responsive means, and energizing circuit completed by said third switching means for maintaining effective said identifying means continuously to identify the group within which any one of said condition-responsive means thereof is connected to said measuring circuit.

41. In a measuring system having a plurality of thermocouples having characteristics suitable for measuring temperatures of differing range, the combination of a plurality of multiple-point switches, a measuring circuit, a compensating network, means including said switches for connecting said thermocouples in sequence between said measuring circuit and said compensating network, said means including means to introduce in circuit with certain of said thermocouples and the measuring circuit predetermined cold-junction compensation voltages in accordance with the range of said certain thermocouples then connected in the measuring circuit.

42. In a measuring system having a plurality of thermocouples having characteristics suitable for measuring temperatures of differing range, the combination of a plurality of multiple-point switches, a measuring circuit, a compensating network, means including said switches for connecting said thermocouples in sequence between said measuring circuit and said compensating network, said means including circuit connections established by said switches for connection of the thermocouples of one range to a selected point of said compensating network and for thermocouples of a differing range to a different point in said compensating network for introducing into said measuring circuit predetermined cold-junction compensation voltages in accordance with the particular range of thermocouples then connected in the measuring circuit.

43. The combination with a recorder, a balanceable measuring circuit, a plurality of groups of condition-responsive means each responsive to the magnitude of a condition, switching means for connecting in succession said condition-responsive means to said measuring circuit and a printing means movable across a record chart and operable to place records thereon under successive control of said condition-responsive means, the position of each record on the chart being indicative of the magnitude of the condition to which its condition-responsive means is subjected, of a compensating network, means for connecting in said measuring circuit a selected part of said network for developing a voltage therein for operation of said printing means to produce records on the chart distinctive by their position and each distinctive by its character and representative of each particular group of condition-responsive means to be connected to said measuring circuit, certain of said groups of condition-responsive means having a response characteristic differing from other groups of said condition-responsive means, said connecting means including means for completing circuit connections between selected parts of said compensating network, the condition-responsive means of one of said groups and said measuring circuit for developing in said measuring circuit predetermined voltages for compensation of the differing response characteristics of said condition-responsive means of said groups.

44. The combination set forth in claim 43 in which the group-identifying records are located adjacent a boundary of the chart and in which said group-identifying records are displaced laterally of each other.

IRVING M. STEIN.
ALBERT J. WILLIAMS, JR.
WILLIAM RUSSELL CLARK.

REFERENCES CITED

The following references are of record in the file of this patent:

UNITED STATES PATENTS

| Number | Name | Date |
|---|---|---|
| Re. 15,617 | Brewer | June 5, 1923 |
| 963,908 | Lee | July 12, 1910 |
| 1,443,165 | Brown | Jan. 23, 1923 |
| 1,496,101 | Schmitt | June 3, 1924 |
| 1,614,222 | White et al. | Jan. 11, 1927 |
| 1,898,124 | Harrison | Feb. 21, 1933 |
| 1,947,255 | Franklin | Feb. 13, 1934 |
| 1,982,053 | Hodgson et al. | Nov. 27, 1934 |
| 2,083,408 | Stein | June 8, 1937 |
| 2,207,343 | Fairchild | July 9, 1940 |
| 2,230,779 | Johnson | Feb. 4, 1941 |
| 2,313,752 | LeClair | Mar. 16, 1943 |
| 2,314,720 | Leathers | Mar. 23, 1943 |
| 2,316,240 | Harrison | Apr. 13, 1943 |
| 2,319,412 | Leathers | May 18, 1943 |
| 2,335,755 | Haddad | Nov. 30, 1943 |
| 2,366,913 | LeClair | Jan. 9, 1945 |

FOREIGN PATENTS

| Number | Country | Date |
|---|---|---|
| 322,333 | Germany | June 26, 1920 |